US006971063B1

(12) United States Patent
Rappaport et al.

(10) Patent No.: US 6,971,063 B1
(45) Date of Patent: Nov. 29, 2005

(54) SYSTEM, METHOD, AND APPARATUS FOR PORTABLE DESIGN, DEPLOYMENT, TEST, AND OPTIMIZATION OF A COMMUNICATION NETWORK

(75) Inventors: Theodore S. Rappaport, Salem, VA (US); Brian T. Gold, Blacksburg, VA (US); Roger R. Skidmore, Blacksburg, VA (US)

(73) Assignee: Wireless Valley Communications Inc., Austin, TX (US)

( * ) Notice: Subject to any disclaimer, the term of this patent is extended or adjusted under 35 U.S.C. 154(b) by 1070 days.

(21) Appl. No.: 09/628,506

(22) Filed: Jul. 28, 2000

(51) Int. Cl.[7] .............................................. G09G 5/00
(52) U.S. Cl. ...................... 715/733; 715/964; 709/203
(58) Field of Search ............................... 345/734, 736, 345/848, 853, 969, 738; 703/7; 715/733, 715/853, 964; 709/223, 224, 203; 340/989, 340/995.1; 701/208, 213; 342/357

(56) References Cited

U.S. PATENT DOCUMENTS

| 4,675,147 A | 6/1987 | Schaefer et al. |
|---|---|---|
| 4,736,453 A | 4/1988 | Schloemer |
| 4,885,694 A | 12/1989 | Pray et al. |
| 5,111,392 A | 5/1992 | Malin |
| 5,119,307 A | 6/1992 | Blaha et al. |
| 5,239,487 A | 8/1993 | Horejsi et al. |
| 5,293,640 A | 3/1994 | Gunmar et al. |
| 5,307,261 A | 4/1994 | Maki et al. |
| 5,337,149 A | 8/1994 | Kozah et al. |
| 5,339,184 A | 8/1994 | Tang |
| 5,375,123 A | 12/1994 | Andersson et al. |
| 5,394,522 A | 2/1995 | Sanchez-Frank et al. |
| 5,450,615 A | 9/1995 | Fortune et al. |
| 5,458,123 A | 10/1995 | Unger |
| 5,465,390 A | 11/1995 | Cohen |
| 5,467,441 A | 11/1995 | Stone et al. |
| 5,482,050 A | 1/1996 | Smokoff et al. |
| 5,485,568 A | 1/1996 | Venable et al. |
| 5,491,644 A | 2/1996 | Pickering et al. |
| 5,491,837 A | 2/1996 | Haartsen |
| 5,493,679 A | 2/1996 | Virgil et al. |
| 5,515,269 A | 5/1996 | Willis et al. |
| 5,528,518 A | 6/1996 | Bradshaw et al. |
| 5,539,665 A | 7/1996 | Lamming et al. |
| 5,553,312 A | 9/1996 | Gattey et al. |
| 5,553,620 A | 9/1996 | Snider et al. |

(Continued)

OTHER PUBLICATIONS

From Bird's Eye Real-time Mapping Software dated Jun. 30, 2002.

(Continued)

*Primary Examiner*—John Cabeca
*Assistant Examiner*—Ting Zhou
(74) *Attorney, Agent, or Firm*—Whitham, Curtis & Christofferson P.C.

(57) ABSTRACT

A system and method which employ one or more portable hand held computers and one or more servers, allows a field engineer to complete the entire design, deployment, test, optimization, and maintenance cycle required to implement successful communications networks. The engineer may take the portable hand held computer into the field, and make alterations to the components, position of the components, orientation of the components, etc. based on on-site inspection. As these alterations to the computerized model are made, predictions for the effects these changes will have on the communications network are displayed to the engineer. Measurements may also be made using equipment connected to or contained in the portable hand held computer, and these measurements may be used to optimize performance criteria. Information can be transmitted to and from the portable hand held computer and the server to allow for complex processing to be performed.

122 Claims, 10 Drawing Sheets

U.S. PATENT DOCUMENTS

| | | | |
|---|---|---|---|
| 5,555,354 A | 9/1996 | Strasnick et al. | |
| 5,561,841 A | 10/1996 | Markus | |
| 5,564,070 A | 10/1996 | Want et al. | |
| 5,586,254 A | 12/1996 | Kondo | |
| 5,594,946 A | 1/1997 | Menich et al. | |
| 5,598,532 A | 1/1997 | Liron | |
| 5,625,827 A | 4/1997 | Krause et al. | |
| 5,636,344 A | 6/1997 | Lewis | |
| 5,689,355 A | 11/1997 | Okubo et al. | |
| 5,710,758 A | 1/1998 | Soliman et al. | |
| 5,755,072 A | 5/1998 | Lingafelter | |
| 5,761,093 A | 6/1998 | Urbish et al. | |
| 5,774,669 A | 6/1998 | George et al. | |
| 5,794,128 A | 8/1998 | Brockel et al. | |
| 5,799,154 A | 8/1998 | Kuriyan | |
| 5,802,146 A | 9/1998 | Dulman | |
| 5,809,282 A | 9/1998 | Cooper et al. | |
| 5,815,395 A | 9/1998 | Hart et al. | |
| 5,821,937 A | 10/1998 | Tonelli et al. | |
| 5,825,759 A | 10/1998 | Liu | |
| 5,828,960 A | 10/1998 | Tang et al. | |
| 5,831,610 A | 11/1998 | Tonelli et al. | |
| 5,832,389 A | 11/1998 | Dent | |
| 5,845,124 A | 12/1998 | Berman | |
| 5,861,887 A | 1/1999 | Butler et al. | |
| 5,867,112 A | 2/1999 | Kost | |
| 5,877,777 A | 3/1999 | Colwell | |
| 5,878,328 A | 3/1999 | Chawla et al. | |
| 5,907,850 A | 5/1999 | Krause et al. | |
| 5,917,808 A | 6/1999 | Kosbab | |
| 5,923,850 A | 7/1999 | Barroux | |
| 5,926,762 A | 7/1999 | Arpee et al. | |
| 5,940,196 A | 8/1999 | Piehler et al. | |
| 5,945,976 A | 8/1999 | Iwamura et al. | |
| 5,948,055 A | 9/1999 | Pulsipher et al. | |
| 5,949,335 A | 9/1999 | Maynard | |
| 5,949,988 A | 9/1999 | Feisullin et al. | |
| 5,953,669 A | 9/1999 | Stratis et al. | |
| 5,963,867 A | 10/1999 | Reynolds et al. | |
| 5,970,406 A | 10/1999 | Komara | |
| 5,977,851 A | 11/1999 | Stancil et al. | |
| 5,987,328 A | 11/1999 | Ephremides et al. | |
| 5,994,984 A | 11/1999 | Stancil et al. | |
| 6,006,021 A | 12/1999 | Tognazzini | |
| 6,018,625 A | 1/2000 | Hayball et al. | |
| 6,021,316 A | 2/2000 | Heiska et al. | |
| 6,032,105 A | 2/2000 | Lee et al. | |
| 6,038,547 A | 3/2000 | Casto | |
| 6,044,273 A | 3/2000 | Tekinay | |
| 6,058,102 A | 5/2000 | Drysdale et al. | |
| 6,058,262 A | 5/2000 | Kawas et al. | |
| 6,059,842 A | 5/2000 | Dumarot et al. | |
| 6,061,722 A | 5/2000 | Lipa et al. | |
| 6,075,541 A | 6/2000 | Maclinovsky | |
| 6,085,335 A | 7/2000 | Djoko et al. | |
| 6,088,522 A | 7/2000 | Lee et al. | |
| 6,104,699 A | 8/2000 | Holender et al. | |
| 6,108,309 A | 8/2000 | Cohoe et al. | |
| 6,111,857 A | 8/2000 | Soliman et al. | |
| 6,122,083 A | 9/2000 | Ohta et al. | |
| 6,148,010 A | 11/2000 | Sutton et al. | |
| 6,167,277 A * | 12/2000 | Kawamoto | 455/457 |
| 6,199,032 B1 | 3/2001 | Anderson | |
| 6,204,813 B1 | 3/2001 | Wadell et al. | |
| 6,208,833 B1 | 3/2001 | Preschutti et al. | |
| 6,229,540 B1 | 5/2001 | Tonelli et al. | |
| 6,243,772 B1 | 6/2001 | Ghori et al. | |
| 6,253,086 B1 | 6/2001 | Parantainen et al. | |
| 6,266,615 B1 * | 7/2001 | Jin | 701/213 |
| 6,285,377 B1 | 9/2001 | Greenbaum et al. | |
| 6,289,203 B1 | 9/2001 | Smith et al. | |
| 6,307,485 B1 * | 10/2001 | Hasegawa | 340/995.15 |
| 6,311,144 B1 | 10/2001 | Abu El Ata | |
| 6,317,599 B1 | 11/2001 | Rappaport et al. | |
| 6,326,987 B2 | 12/2001 | Alexander | |
| 6,330,005 B1 | 12/2001 | Tonelli et al. | |
| 6,337,688 B1 | 1/2002 | Berstis | |
| 6,338,031 B1 | 1/2002 | Lee et al. | |
| 6,356,758 B1 | 3/2002 | Almeida et al. | |
| 6,393,432 B1 | 5/2002 | Flansburg et al. | |
| 6,400,690 B1 * | 6/2002 | Liu et al. | 370/252 |
| 6,408,312 B1 | 6/2002 | Forthman et al. | |
| 6,442,507 B1 | 8/2002 | Skidmore et al. | |
| 6,452,544 B1 * | 9/2002 | Hakala et al. | 342/357.13 |
| 6,456,938 B1 * | 9/2002 | Barnard | 701/213 |
| 6,470,195 B1 | 10/2002 | Meyer | |
| 6,487,417 B1 | 11/2002 | Rossoni et al. | |
| 6,493,679 B1 | 12/2002 | Rappaport et al. | |
| 6,496,290 B1 | 12/2002 | Lee | |
| 6,499,006 B1 | 12/2002 | Rappaport et al. | |
| 6,505,045 B1 | 1/2003 | Hills et al. | |

OTHER PUBLICATIONS

IEEE Transactions on Antennas and propagation, vol. 46, No. 8, Aug. 1998. "Effect oF Terrrain on Path Loss in Urban Enviroments for Wireless Applications" Leonard Piazzi and Henry L. Bertoni.

P. Bahl, V. Padmanabhan, and A. Balachandran, "A Software System for Locating Mobile Users: Design, Evaluation, and Lessons," Microsoft Technical Report, Apr. 2000.

G. Durgin, T.S. Rappaport, H. Xu, Measurements and Models for Radio Path Loss and Penetration Loss in and Around Homes and Trees at 5.85 GHz, IEEE Transactions on Communications, vol. 46, No. 11, Nov. 1998.

C.M. Peter Ho et al., "Antenna Effects on Indoor Obstructed Wireless Channels and a Deterministic Image-Based Wide-Band Propagation Model for In-Building Personal Communications Systems," International Journal of Wireless Information Networks, vol. 1, No. 1, 1994.

S. Kim et al., "Radio Propagation Measurements and Predictions Using Three-dimensional Ray Tracing in Urban Environments at 908 MHZ and 1.9 GHz," IEEE Transactions on Vehicular Technology, vol. 48, No. 3, May 1999.

T.S., Rappaport et al., "Use of Topographic Maps with Building Information to Determine Antenna Placements and GPS Satellite Coverage for Radio Detection and Tracking in Urban Environments," MPRG Technical Report MPRG-TR-95-14, Virginia Tech, Sep. 1995.

R.K. Morrow, Jr. and T.S. Rappaport, "Getting In," Wireless Review Magazine, Mar. 2000.

Wireless Valley Communications, Inc., "SitePlanner 3.16 for Windows 95/98/NT User's Manual," Software User's Manual, pp. 5-148 to 5-156, 1999.

M. Panjwani et al., "Interactive Computation of Coverage Regions for Wireless Communication in Multifloored Indoor Environments," IEEE Journal on Selected Areas in Communications, vol. 14, No. 3, Apr. 1996.

L Piazzi and H.L. Bertoni, "Achievable Acurracy of Site-Specific Path-Loss Predictions in Residential Environments" IEEE Transactions on Vehicular Technology, vol. 48, No. 3, May 1999.

T.S. Rappaport et al., "Wireless Communications: Past Events and a Future Perspective", IEEE Communications Magazine, May 2002.

T,S. Rappaport et al., "Radio Propagation Prediction Techniques and Computer-Aided Channeling Modeling for Embedded Wireless Microsystems," ARPA Annual Report, MPRG Technical Report MPRG-TR-94-12, Virginia Tech, Jul. 1994.

T.S., Rappaport et al., "Use of Topographic Maps with Building Information to Determine Antenna Placements for Radio Detection and Tracking in Urban Environments," MPRG Technical Report MPRG-TR-95-14, Virginia Tech, Nov. 1995.

D. Ullmo et al., "Wireless Propagation in Buildings: A Statistical Scattering Approach," IEEE Transactions on Vehicular Technology, vol. 48, No. 3, May 1999.

T.S. Rappapoprt, "wireless Communications: Principles and Practice" Second Edition, Prentice Hall, 2002.

T.S.. Rappaport et al., "Use of Topographic Maps with Building Information to Determine AntennaPlacements and GPS Satellite Coverage for Radio Detection and Tracking in Urban Environments," MPRG Technical Report MPRG-TR-95-14, Virginia Tech, Sep. 1995.

T.S. Rappaport et al., "Indoor Path Loss Measurement for Homes and Apartments at 2.4 and 5.85 GHz," private report produced for Motorola, Dec. 16, 1997.

T.S. Rappaport, "Isolating Interference," Wireless Review Magazine, May 2000.

Slides from T.S. Rappaport and R. Skidmore, "Introduction to In-Building Wireless Systems," Infocast In-Building Wireless Solutions Conference and Exposition, Feb. 4, 2003.

S. Sandhu, M.P. Koushik,and T.S. Rappaport "Predicted Path Loss for Roslyn VA, First set of predictions for ORD Project on Site Specific Propagation Prediction," MPRG Technical Report MPRG-TR-94-20, Virginia Tech, Dec. 1994.

S. Sandhu, M.P. Koushik, and T.S. Rappaport, "Predicted Path Loss for Roslyn VA, First set of predictions for ORD Project on Site Specific Propagation Prediction," MPRG Technical Report MPRG-TR-94-20, Virginia Tech, Mar. 1995.

S. Seidel et al., "Site-Specific Propagation Prediction for Wireless In-Building Personal Communication Design," IEEE Transactions on Vehicular Technology, vol. 43, No. 4, Nov. 1994.

S. Shakkottai and T.S. Rappaport, "Research Challenges in Wireless Networks: A Technical Overview," Proceeding of the Fifth International Symposium on Wireles Personal Multimedia Communications, Honolulu, HI, Oct. 2002.

H. Sherali et al., "On the Optimal Location of Transmitters for Micro-cellular Radio Coomunication System Design," IEEE Journal on Selected Areas in Communications, Vol. vol. 14, No. 3, pp. 662-673, May 1996.

R, Skidmore et al., "A Comprehensive In-Building and Microcellular Wireless Communication System Design Tool" The Bradley Department of Electrical Engineering, MPRG-TR-97-13, Jun. 1997. Master's Thesis—unpublished by Virginia Tech for 2 years after submission.

R. Skidmore, et al., Russell Senate Office Building Propagation Study, Project Report for Joseph R. Loring & Associates; "Project Update," AoC Contract # Acbr96088, prepared for Office of the Architect of the Capital, Jan. 19, 1997.

R. Skidmore, et al., Russell Senate Office Building Propagation Study, Project Report for Joseph R. Loring & Associates; "Assessment and Study of the Proposed Enhancements of the Wireless Communications Environment of the Russell Senate Office Buidling (RSOB) and Associated Utility Tunnels," AoC Contract # Acbr96088, prepared for Office of the Architect of the Capitol, Feb. 20, 1997.

R. Torres et al., "CINDOOR: An Engineering Tool for Planning and Design of Wireless Systems in Enclosed Spaces," IEEE Antennas and Propagation Magazine, vol. 41, No. 4 Aug. 1999.

R. Skidmore et al., "Interactive Coverage Region and System Design Simulation for Wireless Communication Systems in Multi-Floored Indoor Environments: SMT Plus tm," IEEE ICUPC Proceedings, 1996.

T.S. Rappaport et al., "Radio Propagation Prediction Techniques and Computer-Aided CHannel Modeling for Embedded Wireless Microsystems," MPRG Tech. Report MPRG-TR-95-08, Virginia Tech, Jul. 1995.

Company Web Page "Actix" www.actix.com product name: E-NOS ( now E-AMS).

Company Web Page Agilent www.agilent.com product name: OPAS32.

Company Web Page " Agilent " www.agilent.com product name: Wizard.

Company Web Page " Comarco" www.edx.com product name: SignalPro.

Company Web Page " ComOpt" www. comopt.com. product name: CellOpt AFP.

Company Web Page " Lucent" www.bell-labs.com product name: WiSE.

Company Web Page " Ericsson" www.ericsson.com product name: TEMS Lite.

Company Web Page " Ericsson" www.ericsson.com product name: TEMS.

Company Web Page " Marconi" www.marconi.com product name: PlaNET.

Company Web Page " Marconi" www.marconi.com product name: decibelPlanner.

Company Web Page " Schema"www.schema.com product name: Optimizer.

Company Web Page " ScoreBoard" www.scoreboard.com product name: ScoreBoard.

Software by Andrew titled "RF Planner" dated Jun. 17, 1997.

A user guide titled "Andrew Microwave System Planner" dated Jul. 1999.

A user guide titled "Andrew Antenna System Planner" dated Jun. 1999.

Article "Building Database Manipulator" Copyright, Jan. 1998; MPRG and Virginia Tech.

PCS 97 Track 7; Engineering & Systems Management; T. Rappaport.

Propagator; vol. 8, No. 3; Fall 1997.

SMT Plus 1.0 User's Manual; R. Skidmore & T. Rappaport; Copyright, Aug. 1996 Virginia Tech.

* cited by examiner

SYSTEM, METHOD, AND APPARATUS FOR PORTABLE DESIGN, DEPLOYMENT, TEST, AND OPTIMIZATION OF A COMMUNICATION NETWORK

BACKGROUND OF THE INVENTION

1. Field of the Invention

The invention generally relates to a miniature portable system for design, deployment, test, and optimization of a communications system, such as an indoor or campus-wide wireless or wired communication network. A handheld computing platform is used for the collection and display of communication signal properties, the manipulation of communication system components in a communications network design, and the prediction and optimization of communication systems during design, deployment, or maintenance operations.

2. Description of the Related Art

In recent years the use of wireless communication technology, such as cellular phone networks, has greatly increased. Moreover, it has become common to implement wireless communication systems within buildings or large facilities comprising several buildings. Examples of typical wireless communication systems are local area networks (LAN), wide area networks (WAN), or cellular phone networks such as PBX, or local loops. Due to the increasingly diverse applications of wireless communication systems, system designs have become increasingly complicated and difficult to implement. Common to all communication system designs, regardless of technology, size or scale, is the need for measurement data at some point in the design process. Whether in the initial design stage or the final verification stage, no communication system is implemented without the input of measurement data. However, measurement acquisition within in-building environments is much more tedious and time consuming than in the macrocellular environment where measurement acquisition is carried out using Global Positioning System data to determine the location of the measurement being taken. Global Positioning System (GPS) data, which so many RF engineers have come to rely upon for outdoor measurement acquisition, is not an option for microcell environments. Therefore, recording real-time measurement data within a building becomes a laborious, time-consuming task involving scratched notes and blueprints and manual data entry which are both expensive and ineffectual in many respects.

In addition to measuring RF signal properties from emitted base transceivers there is also a need to measure data throughput time in computer data networks. Throughput time is the time required to transfer a record or file of known size from one computer to another. In order to standardize the measurement of data throughput time for comparison or verification purposes, files of a set size (e.g. 100 K) are used and transferred in packet sizes such as 512 bytes. Similar to RF signal attenuation, data throughput time is also a function of transmission distance and signal obstruction (e.g. walls, doors, partitions), as well as multipath propagation and the specific radio modem design.

Various signal property measurement acquisition tools and systems have been developed to aid in the design of wireless communication systems such as PenCat™, Walkabout PCS™ and TEMS Light.

LCC International Inc. offers the PenCat™ as a pen-based collection and analysis tool for wireless communication design that runs on a small hand-held tablet computer. The PenCat™ system enables a user to roam about a building, take signal property measurement data at a location in the building using a receiver linked to the tablet computer, and link the measured data to that building location on a computer map representing the building by tapping the appropriate portion of the map on the computer screen with a stylus pen. The building map can be entered into the PenCat™ system by either scanning blueprints, sketching the building within the application, or importing from another source. PenCAT uses two dimensional bit maps to model the building environment.

Safco Technologies, Inc. offers the Walkabout PCS™ system as a portable survey coverage system for use in indoor or outdoor wireless communication system design. Similar to PenCat™, the Walkabout PCS™ system utilizes a hand-held computer linked to a receiver for measuring signal properties at a given location and linking the measured property data to that location represented on a stored computer map. Also similar to the Safco Walkabout is the Agilent 74XX indoor measurement system, which also uses a bitmap floor plan.

Ericsson Radio Quality Information Systems offers the TEMS Light system as a verification tool for wireless communication indoor coverage. The TEMS Light system utilizes a Windows-based graphical interface with two dimensional bit map drawings on a mobile computer linked to a receiver to allow a user to view a stored building map, make location specific data measurements, and link the measured data to the represented location on the stored computer map. Unlike other in-building communication measurement systems, InFielder™ by Wireless Valley Communications, Inc. merges measurement data with periodic updates of position location on a three-dimensional model of the physical environment. The InFielder™ product concept is disclosed in U.S. patent application Ser. No. 09/221,985 filed Dec. 29, 1998, and the contents of this application are herein incorporated by reference.

In addition to the above-discussed wireless communication systems verification tools, various wireless communication system prediction tools have also been devised such as Wireless Valley Communications Incorporated's Predictor™ and Ericsson Radio Quality Information Systems' TEMS. Predictor™ allows a wireless communication system designer to predict the coverage area of a particular wireless system in a building or across multiple buildings. Predictor™ creates a computer simulation using a computer stored building or facility database and a defined transceiver location and type within the database. Based on the building configuration and building material properties defined in the database a prediction of the coverage area of the wireless system is extrapolated by site-specific propagation whereby rays drawn between the transmitter and receiver and three-dimensional building information are used for prediction computations. The TEMS system predicts indoor coverage of a wireless system based on a stored building map and input base transceiver locations and types using statistical radio coverage models.

While the above-mentioned design and verification tools have aided wireless system designers in creating indoor wireless communication systems using building drawings and linking data measurements to building drawings, none of the devices, except for InFielder™ and Predictor™, incorporate three-dimensional building drawings to enhance the design process. Further, the above-mentioned devices and systems lack the ability to track a roving user while autonomously or passively measuring or collecting network performance data while uploading or downloading the data to a remote monitoring location. These capabilities may be required for installation and ongoing monitoring and management of wireless devices for global network access.

There have been recent innovations in the use of portable handheld computers as information collection devices for field maintenance and service. River Run Software has produced the OnSite software that uses a Geographic Information System (GIS) to display street maps of a desired location. Using custom designed information gathering forms, OnSite allows a field operator to go directly to a location, gather information, and either return with that information of send the gathered data over a wired or wireless communications link to another computer. Autodesk, Inc. also produces a software tool called OnSite that, although independent of River Run's OnSite, accomplishes a similar task. Autodesk's OnSite allows a field operator to collect information in a remote setting using a GIS mapping engine and Oracle database software, and return with that information for record keeping, etc.

The River Run and Autodesk products are strictly outdoor field maintenance tools and only display two dimensional raster images to the user. These products do not address the complexities of the three dimensional world of in-building systems, which is significantly more difficult to model and visualize due to multiple stories or unique three dimensional features. Furthermore, these products only allow viewing and retrieval, and do not permit on-site or remote adjustment and manipulation of modeled features.

SUMMARY OF THE INVENTION

According to the present invention, a system is provided for allowing a system designer to dynamically model a communications system electronically in any environment. The method includes the selection and placement of models of various communications system hardware components, such as hubs, routers, switches, antennas (point, omnidirectional, directional, leaky feeder, distributed etc.), transceivers, amplifiers, cables, splitters, and the like, and allows the user to visualize, in three-dimensions, the effects of their placement and movement on overall system performance throughout the modeled environment. Thus, the placement of components can be refined and fine-tuned prior to actual implementation of a system to ensure that all required regions of the desired service area are blanketed with adequate RF coverage, data throughput, or system performance. The three-dimensional visualization of system performance provides system designers with tremendous insight into the functioning of the modeled communication system, and represents a marked improvement over previous visualization techniques. Furthermore, the invention allows maintenance personnel to retrieve and inspect previous designs, or to rapidly locate components while in a particular location.

To accomplish the above, a 3-D model of the physical environment is stored as a CAD model in an electronic database. The physical, electrical, and aesthetic parameters attributed to the various parts of the environment such as walls, floors, foliage, buildings, hills, and other obstacles that affect radio waves are also stored in the database. A representation of the 3-D environment is displayed on a computer screen for the designer to view. The designer may view the entire environment in simulated 3-D, zoom in on a particular area of interest, or dynamically alter the viewing location and perspective to create a "fly-through" effect. Using a mouse or other input positioning device the designer may select and view various communication hardware device models from a series of pull-down menus. A variety of amplifiers, cables, connectors, and other hardware devices may be selected, positioned, and interconnected in a similar fashion by the designer to form representations of complete communication systems.

A region of any shape or size may be selected anywhere within the displayed environment, or automatically selected based upon certain criteria (e.g., selecting an entire building). The selected region is overlaid with a grid containing vertices of selectable size, shape, and spacing to form a mesh or blanket. Each vertex corresponds to a single point within the 3-D environment. Thereafter, a communication system performance prediction model is run whereby the computer displays on the screen at each vertex of the mesh the predicted performance values, for instance, received signal strength intensity (RSSI), network throughput, packet latency, packet error rate, distributed power levels, quality of service, bit error rate, frame error rate, signal-to-interference ratio (SIR), and signal-to-noise ratio (SNR), provided by the communication system just designed. The display is such that the computer adjusts the elevation and/or coloring including characteristics such as saturation, hue, brightness, line type and width, transparency, surface texture, etc., of each vertex relative to the surrounding vertices to correspond to the calculated performance values. The coloring and elevation may correspond to the same calculated performance value or to different calculated performance values. For example, elevation may correspond to received signal strength intensity (RSSI), and color may correspond to signal-to-noise ratio (SNR), or any other of a variety of calculated performance parameters. The user is able to specify boundaries for this display in terms of selecting the range of elevations, colors, or other aesthetic characteristics from which the vertices of the mesh are assigned. Alternatively, the system can automatically select limits and ranges for the heights, colors, and other aesthetic characteristics. The result is a region of fluctuating color and elevation representing the changing wireless system performance throughout different portions of the modeled 3-D environment. The region may be viewed overlaid with the 3-D environment.

An important focus of this invention is the use of miniature, hand-held (e.g., Palm), portable computers which have been adapted to provide a technician with a display of all or a portion of a three dimensional model, allow for on-site manipulation of the model (e.g., adjustments as to choice of equipment, placement in the space, and orientation) to obtain performance prediction and other valuable information. These hand-held portable client computers also provide a measurement capability for measuring various communications performance parameters within the space which measurements can be utilized either in the hand-held, portable client computers and/or be transmitted to one or several server computers, which may or may not be similar hand-held portable computers. During testing, actual performance values may be measured and entered into the hand-held computer (or gathered directly if the hand-held computer is equipped with an appropriate measurement device) and either sent to one or more of the servers for display, logging, and tuning the prediction models or for use in the prediction models on board the hand-held computer. In addition, the hand-held portable client computers may be equipped with global positioning technology or other location equipment which allow the technician to locate himself within a building or campus. Used in conjunction with the measurement features, the technician can have the portable hand held computer sample various measurements either overtly or passively in the background and have them paired to location information which will assist in modeling the space and making various optimizing changes in the deployed system. Many other advantages in deploying, testing, and optimizing communication networks may be achieved using the hand-held portable client computers, either alone or in combination with the server computers. Preferably, the hand-held portable client computers will allow for the selection of various buildings in a campus environment and display various floor plan layouts for multi-story buildings selected by the technician.

A method for representing sophisticated 3-D vector databases of buildings and campuses of buildings is described. With this system, a field technician can carry the hand-held computer into the field and use the displayed information to select placement of the components and build the physical communication system. Another advantage of the system is that field engineers can modify the plan while building the physical system. Modifications such as removing, adding, or editing positions or parameters of components can be entered into the hand-held computer acting as a client and can be transmitted to the server where an updated environment and prediction model can be calculated and sent back to the hand-held computer. Alternatively, calculations can be performed at the hand held computer, the modifications can be made, and the updated model can then be uploaded to the server. Thus, this system allows for bi-directional data flow between the client and server. Other data, such as measured or predicted network performance parameters, files, photographs, notes, and general information may be embedded or sent separately with the model.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Using the present invention, it is now easier than ever to design, deploy, test, optimize, and maintain communication networks in and around multi-floored buildings, campuses of multi-floored buildings, and environments including outdoor 3-D terrain. The present method is a significant advance over the prior art in the breadth of information presented to the user while operating a portable handheld computer. Using the embodiment presented, an engineer can cover the complete cycle of design, deployment, test, and maintenance for a communications network.

To facilitate navigation within a multi-floored building or campus of multi-floored buildings or in an outdoor 3-D environment, the present invention provides for a computer aided design (CAD) or other similar system to assist in creating graphical drawings representing the building system. Being able to smoothly navigate within a physical environment including a building or campus of buildings is critical for the aforementioned cycle of design, deployment, test, and maintenance of communication networks. In a large system with complex network assets, a sophisticated information management system is especially necessary during the design and deployment and maintenance stages.

Figure 1:
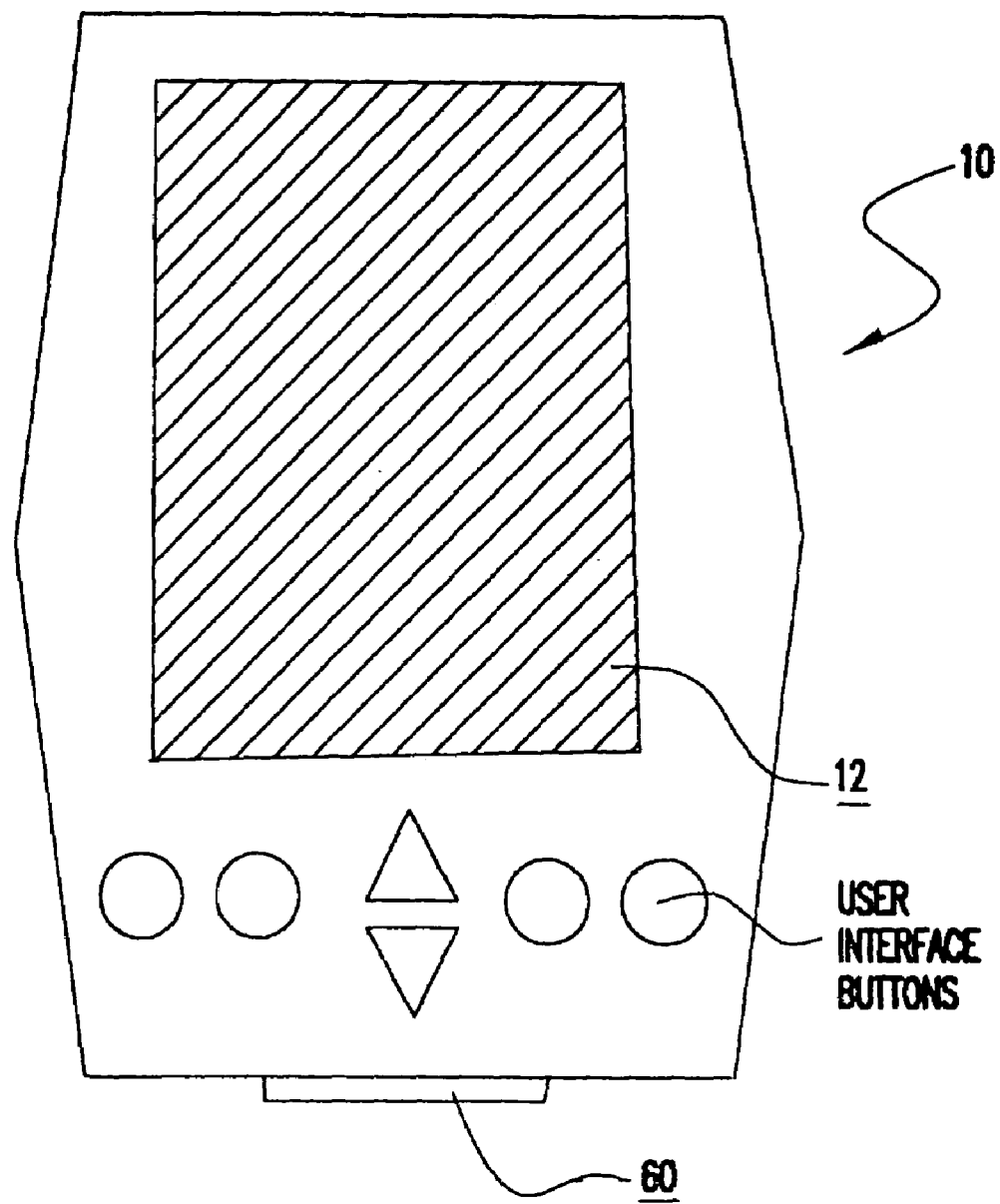
FIG. 1 is a plan view of a portable, hand-held computer.

An exemplary embodiment of the invention runs on a portable handheld computer. The current embodiment uses the Palm IIIC portable handheld computing device, as shown in FIG. 1, from Palm Computing Inc, of Santa Clara, Calif. One skilled in the art will see that many other portable handheld computers could be used as hardware platforms while staying within the spirit of the present invention. Some examples for other potential hardware platforms would be cellular phones, other personal digital assistants (PDAs) running the PalmOS operating system (OS) from Palm Computing, Inc. of Santa Clara, Calif., Pocket PC s running the Windows CE OS from Microsoft, Inc. of Redmond, Wash., and in some cases larger pen tablet computers running a member of the Windows operating system family or another powerful OS such as Linux or Be.

The hand-held computer 10 is programmed to provide on the display 12 two-dimensional layouts and three-dimensional images of a building or campus in which a communications network is or will be deployed. As an example of the type of software which could be used in the practice of this invention, Wireless Valley Communications, Inc. of Blacksburg, Va. markets a software product named SitePlanner® which is a tool suite that has computer aided design (CAD) facilities that can provide the layout of buildings and 3-D terrain, insert morphological objects such as trees, shrubbery, or human populations, and place network components. In a preferred embodiment, a 3-D environmental database is created in SitePlanner® to model the physical environment under study, as disclosed in co-pending application Ser. No. 09/218,841, filed on May 26, 1999, the complete contents of which is herein incorporated by reference. The resulting definition utilizes a specially formatted vector database comprising lines and polygons that represent physical objects within the environment. The arrangement of lines and polygons in the database corresponds to physical objects in the environment. For example, a line or other shape in the database could represent a wall, a door, a tree, a building wall, or some other physical object in the modeled environment.

SitePlanner® has been designed as a wireless communications planning, design, test, and optimization tool suite.

The powerful CAD facilities that SitePlanner uses to model buildings are not unlike the capabilities of most common CAD tools. As such, one skilled in the art could easily see how other CAD packages could be used to generate similar 3-D representations of multi-floored buildings and campuses of multi-floored buildings.

The current invention presents a method for compactly representing the database of physical objects within the environment. One novel aspect of the invention is the use of a 3-D environment database designed for a portable handheld computer. Current portable handheld computers lack the vast amounts of hard disk storage, random access memory (RAM), or processor speed common to desktop Personal Computers (PC s). The present invention provides a method for representing sophisticated 3-D vector databases of buildings and campuses of buildings in a compact space suited for a portable handheld computer system.

The term vector format is used here to mean a representation for a point in some logical space. In dealing with 3-D vector systems, three spatial coordinate axes, X, Y, and Z, are typically used to represent a point in space. The vector database specifies the boundaries of the vector space used, often giving a transformation matrix to convert points in the database vector space with a physical units system such as inches or meters. To represent lines, circles, or other compound shapes, a vector database uses sequences of vector points. For instance, a line in 3-D is usually specified with a starting point and ending point. Polygons are typically specified as a set of 3-D vector points.

A raster format is drastically different from the vector format described above. In a raster database, every point in the specified space must be identified with a value. For instance, the most common type of raster database is the bitmap image, where the value of every point, or pixel, in the image is given. A raster representation is typically far less compact than a vector representation, and additionally is usually not easily scaled to show finer resolution details. Thus a vector database is preferable when dealing with a portable handheld computer with limited storage facilities.

SitePlanner® preferably uses the .dwg vector database format of Autocad, a product of Autodesk, Inc. of San Rafael, Calif. The .dwg file format was not designed for use in a computer with limited storage or display capabilities, and so the present embodiment uses a file format termed Wireless Valley Communications Portable Database, or "WPD". A "WPD" file is a file that is simply constructed so that storage space, bandwidth, and processor power need not be excessive. In a .dwg file, large floating-point numbers are used to specify coordinates in the vector space; however, a WPD file uses a simpler integer representation to specify the same coordinates. While the .dwg file does give more precision that than would, given the limited display facilities of a portable handheld computer, the remarkable precision of .dwg is not required.

To compactly represent shapes such as lines, circles, and even text or contour surfaces, the WPD specification uses instruction commands known as opcodes, and associated instruction parameters termed operands. There are unique opcodes that tell the software reading the WPD file where to draw a line, what color to use when drawing the line, how thick the line should be drawn, etc. Each of these opcodes uses different operands to inform the software reading the WPD file how or where to draw the object. For instance, along with the opcode for drawing a line, the operands specify the beginning and ending vector points for the line. When an application is reading a WPD file, the opcodes are parsed sequentially. That is, the opcodes come in a chronological order according to how objects should be displayed on the screen or commands should be executed.

When storing opcodes and operands in a WPD formatted file, binary-only data is written. The present invention differs from some prior art that allows ASCII strings to represent instructions or opcodes. By using a binary representation, the WPD files will be significantly smaller. On top of the compact binary representation, the WPD file may be compressed using the LZ77 compression technique. The LZ77 compression algorithm is a standard mechanism for exploiting redundancy in data streams. More information on the LZ77 compression algorithm can be found in Ziv J., Lempel A., A Universal Algorithm for Sequential Data Compression, IEEE Transactions on Information Theory, Vol. 23, No. 3, pp. 337–343.

The WPD specification, in terms of its use of binary opcodes and operands to compactly store data, is not a new concept. Significant prior art can be exhibited: the Windows Metafile (WMF) specification from Microsoft, Inc. of Redmond, Wash.; the Drawing eXchange Format (DXF) from Autodesk, Inc. of San Rafael, Calif., the Drawing Web Format (DWF) also from Autodesk, Inc. of San Rafael, Calif., and many others, some of which even apply compression techniques such as LZ77 and others. However, none of the prior art contemplates use on a portable handheld computer nor does previous art provide a measure for display of a three dimensional environment that includes integration of networking components, and communication system performance when providing remote monitoring through a server.

The present embodiment preferably exists in part as a module within the SitePlanner® tool suite. This module within SitePlanner® provides functionality so that a user can export a .dwg database of a 3-D environment into a compact WPD file which conserves memory and bandwidth when compared with .dwg and other drawing formats. To export a .dwg file, each building, tree, floor, plant, wall, elevator, etc. must be translated from the representation in a SitePlanner®.dwg file into the corresponding representation within the WPD file. Such a translation is preferably done using a look-up table (LUT) where representations in the .dwg format have a corresponding representation using WPD opcodes and operands. In the current embodiment, each building is exported into a unique WPD file. The exported file is ready to be packaged for use on a portable handheld computer.

In addition to fully supporting a vector format for representing a physical 3-D environment, the current embodiment supports users who only have raster images of the environment or building. To construct a 3D representation of a multi-floored building, a user may use a collection of 2-D raster images stacked together. While consuming considerably more memory, it has been found that many users do not have access to electronic CAD drawings of a building, and are forced to use scanned blueprints or other raster images.

Figure 2:
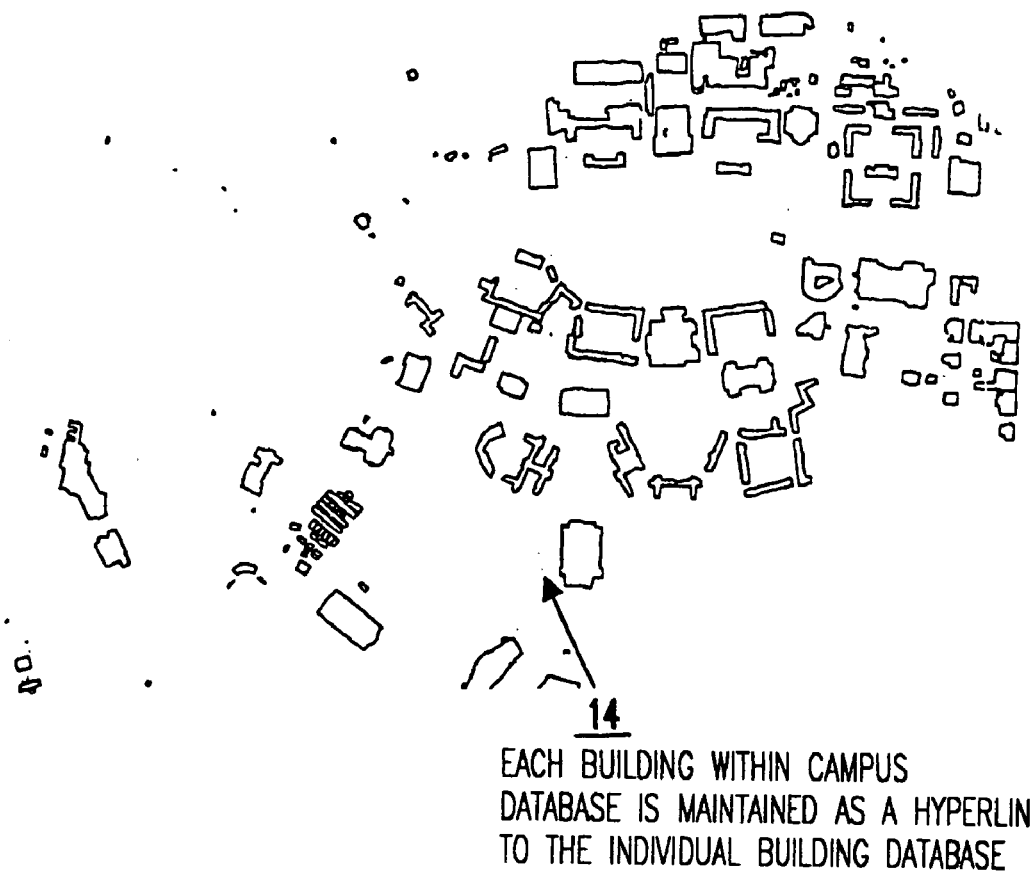
FIG. 2 is a schematic view of a visual campus database to be displayed on the portable, hand-held computer.

The present invention preferably employs a novel management feature termed the "visual campus database" to assist in organizing a campus of multi-floored buildings. Using the previously defined WPD format, a 2D pictorial representation, either vector or raster, can be used to display a campus of multi-floored buildings from a top-down view, as shown in FIG. 2. When entering a building, the user views the display of the hand-held computer and taps or selects the pictorial representation of the desired building 14. In the present embodiment, a building hyperlink opcode is used to instruct the software in the hand-held computer where to find the WPD file associated with the selected building.

Using a building hyperlink reduces memory usage and improves drawing time, two critical features for operation on a portable handheld computer.

In the current embodiment where a Palm IIIC portable handheld computer is used, a Palm DataBase (PDB) header structure must be placed at the top of each WPD file when it is first created. The PDB header tells the PalmOS what the name of the database is, the type of database, the application associated with the database, among other management utilities. In the case of the current embodiment, each WPD file is assigned a database type referred to as "WPDB" indicating Wireless Valley Communications Portable DataBase. The creator ID, that is the application associated with the WPD file, is given an alphanumeric tag indicating it will be employed on the hand held computer. In the preferred embodiment, a four letter tag is used for implementation on a Palm IIIC.

In the present embodiment, a WPD database, having had the PDB header structure inserted, is given the extension .pdb. The .pdb file is then ready to be transferred from the desktop PC to the portable handheld computer and stored on the portable hand held computer. In the current embodiment, the transfer from desktop PC to portable handheld computer uses the hotsync docking cradle accessory supplied with the Palm IIIC.

Figure 3:
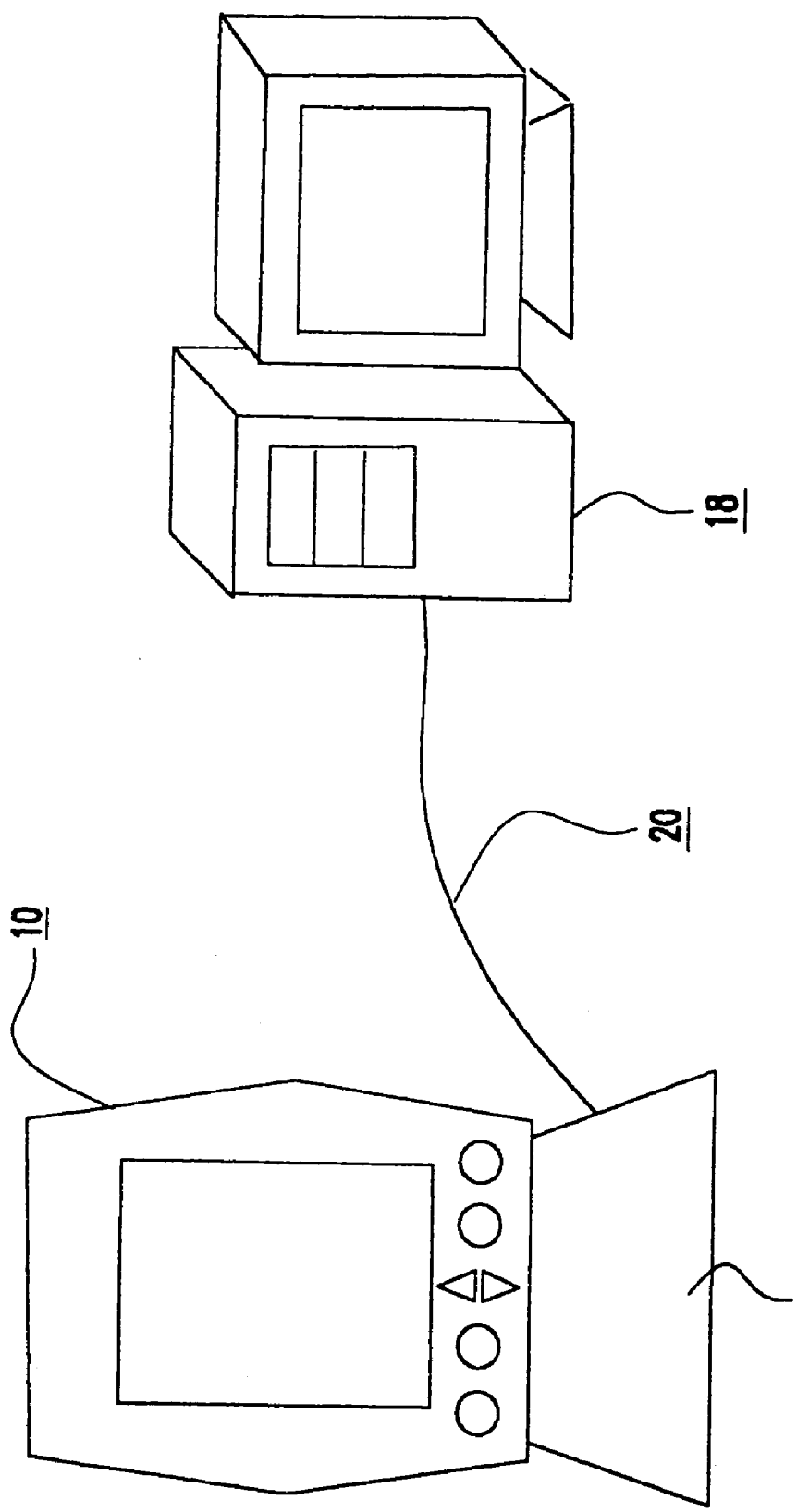
FIG. 3 is a schematic of the system of the present invention which includes at least one portable computer and at least one server computer which can exchange data and other information.

Referring now to FIG. 3, the docking cradle 16 connects to the serial port of the PC 18, allowing for a transfer of Palm OS applications (.prc files) and databases (.pdb files) through the serial link 20. With the Palm IIIC secured in the docking cradle, a program supplied by Palm Computing, Inc. of Santa Clara, Calif. is used to transfer the .pdb database. The use of the transferal program is transparent to the end-user, masked by a background application call from within SitePlanner®. The user then removes the portable handheld computer 10 from the docking cradle 16 and is ready to begin operating the hand held computer 10. Of course, it will be understood by those of skill in the art, that information can be transmitted between the hand-held computer 10 and the PC 18 by means other than a serial link 20 (e.g., other wired or optical connections, wireless connections, etc.). In the present invention, the hand-held computer 10 serves as a "client" to the PC 18 which serves as "server". In the invention, there may be one or a plurality of clients and one or a plurality of servers. In addition, the clients and servers can transfer, store, and display information to and amongst each other by a variety of methodologies including electrical or optical link or wireless communication.

Figure 4:
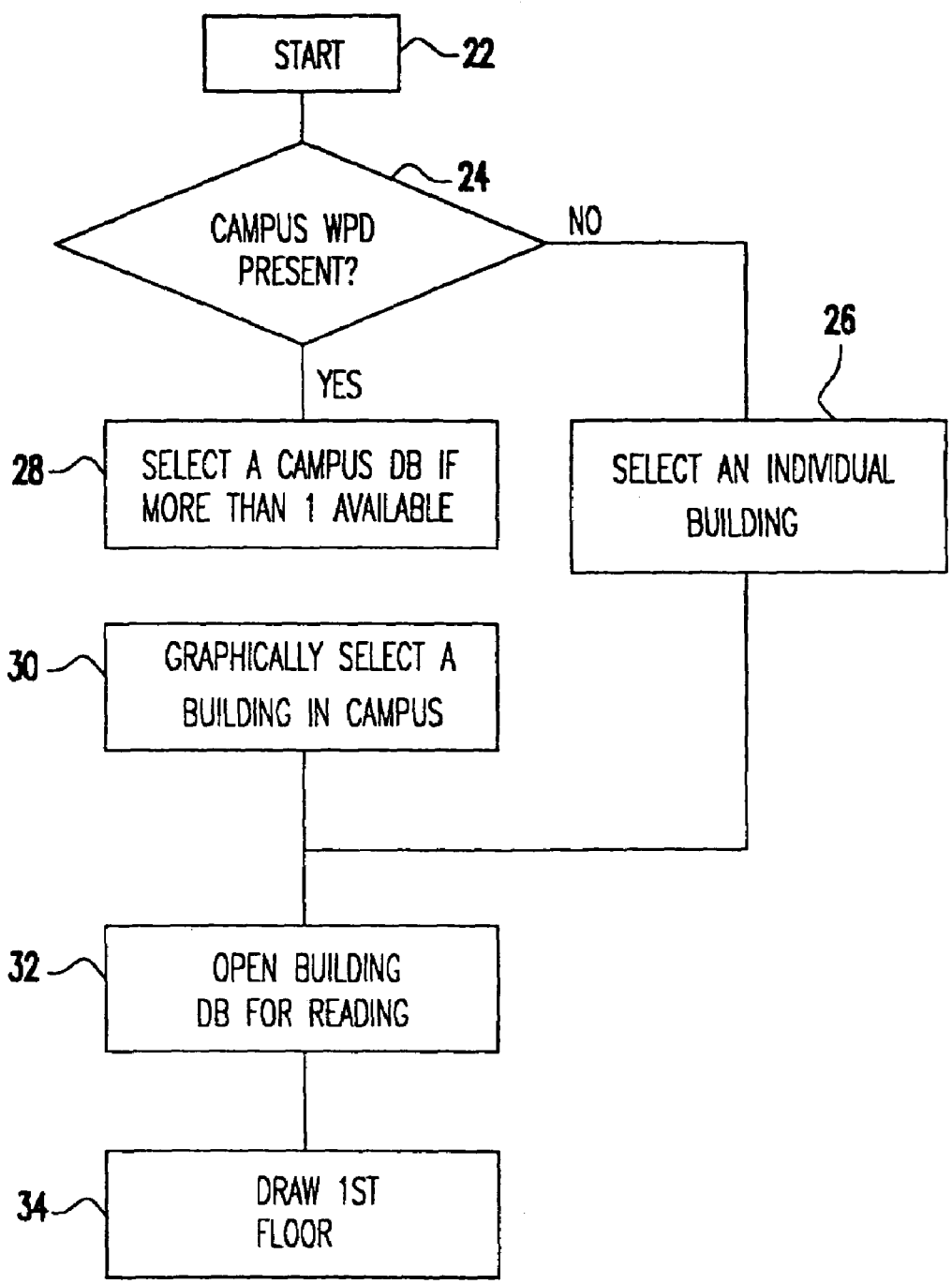
FIG. 4 is a flow diagram showing the opening sequence used when obtaining files for use on the portable computer.

As shown in FIG. 4, when the software is started at 22, the system checks to see if there are any present visual campus databases at decision block 24. If there are no campus databases present, a list of single building databases is given at block 26. If a visual campus database was found and selected at block 28 (such as that shown in FIG. 2), the user then graphically picks which building is to be entered at block 30. The selected building database is then opened for reading at block 32. By default the first floor of the building is drawn on screen at block 34. Note the user may use the visual campus database to represent any large outdoor environment, such as a city or a coverage area typically served by macrocellular wireless systems.

In the present embodiment, only one floor of each building may be displayed at a time. However, it will be understood by those of skill in the art that 3-D visualizations could be used to provide more information to the user. A list of floors in the current building is preferably provided to the user in the Graphical User Interface (GUI) on the portable handheld computer. As the user moves from one floor to another, the current floor may be selected from the list of floors.

Figure 5:
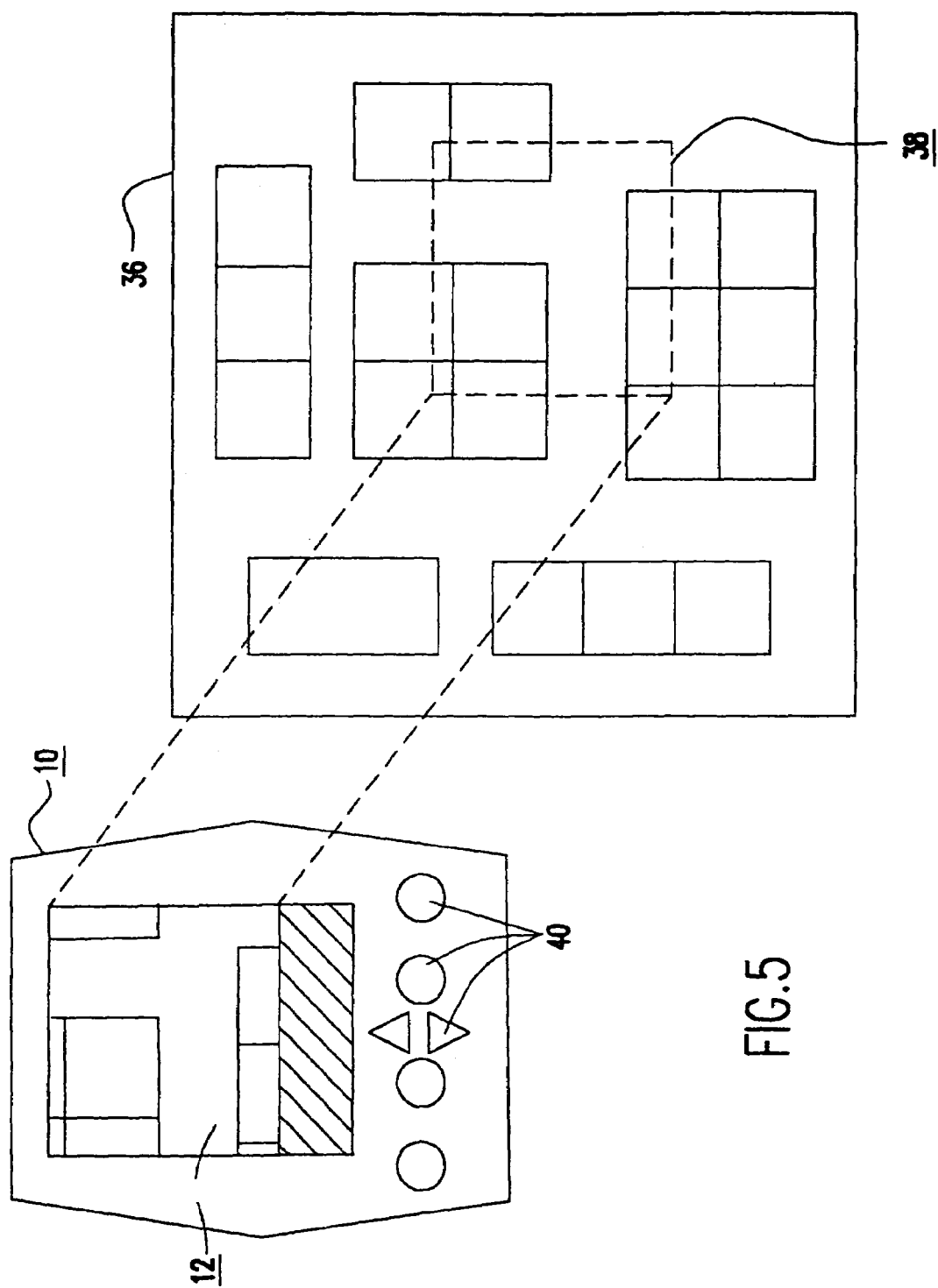
FIG. 5 is a schematic diagram which illustrates the double buffering concept which is used to speed up the information displayed to the technician.

The hand held computer and software can employ a method for drawing and storing the current floor known as double buffering, as shown in FIG. 5. Double buffering involves drawing the current floor into an off-screen buffer in memory 36. In the present embodiment, the off-screen buffer may be larger than the primary display 12 size. Thus, the current view, or viewport 38, occupies a smaller rectangle within the off-screen buffer 36. The viewport 38 always has the same or smaller resolution size as the primary display 12. Using double buffering reduces flicker and apparent drawing times. To draw the active viewport 38 on the actual display screen 12, the Palm OS software development kit is used to copy the data within the off-screen buffer into the display screen's buffer.

In the current embodiment, to pan around in a building floor, the user selects the pan button on the graphical user interface (GUI). Tapping on the screen and dragging the stylus around will cause the viewport 38 window location to change within the off-screen buffer 36. As the viewport coordinates change, the screen is updated by recopying the visible area onto the display. Zooming in and out of a drawing is implemented in a similar fashion. When the user selects a zoom tool button (either zoom in or zoom out) on the GUI and taps on the screen, the viewport window size is changed accordingly, and the screen is redrawn using the tapped location as the new center for the drawing. The maximum zoom level occurs when the viewport window is scaled such that the number of pixels in the display window matches the number of coordinate points in the WPD file contained within the active viewport window. User interface buttons 40 can be used to do the navigation described above. Alternatively, soft keys could be displayed on the screen of the portable computer 10 which would allow zoom and movement of the viewport 38.

The technique described above, as well as other comparable techniques, allows one to easily navigate within a complex system of multi-floored buildings.

Building material properties such as wall densities and material types, glass thickness, etc. or material manufacturer names and sources can be also embedded within the WPD file. When a building floor is viewed in the present embodiment, the user may select a building object and view the object's properties directly on the portable handheld computer 10. In the current embodiment, to view the object's properties, the user preferably taps or clicks on the object and selects "Properties" from the Edit menu displayed hand-held computer 10. A new window, or "form" in Palm OS terminology, would then be displayed showing the embedded material properties, manufacturer information, etc. Clearly, alternative methods could be used to identify and indicate the materials property on the display screen of the hand held computer. The important feature is that in the system contemplated by this invention, the technician charged with deploying or optimizing the communications network is provided with a hand-held computer from which he can view the components contemplated for the system, and can, within his or her discretion select alternative components for use in the system and be provided with information showing the effects different materials selections will have on the system being deployed or optimized.

This system can also have embedded information specific to a communications network. For instance, attenuation properties of building objects can be stored within the database. In the present embodiment, a means for embedding communication network components within the WPD file has been specified. Components such as base stations, antennas, coaxial cable, twisted pair cable, fiber optic cable, telephone wiring, couplers, amplifiers, equalizers, hubs, switches, routers, firewalls, power distribution components, and more can all be specified within SitePlanner®, and be exported in a WPD file as disclosed herein, and viewed using the hand held computer 10.

Preferably, the user can manage all network specific assets using a bill of materials from SitePlanner® as specified in pending application Ser. No. 09/318,842 filed May 26, 1999, the complete contents of which is herein incorporated by reference. In addition, asset management data such as physical condition, installation cost, component cost, depreciation, maintenance schedules, and important facilities management information may be stored and displayed. To view bill of materials information on the portable handheld computer 10, the embedded network components and their physical locations within the environment are extracted from the WPD file and linked into a list of assets. In the present embodiment, the user may view the list of assets by selecting View BOM within the "Tools" menu item on the hand held computer 10. A list of all the network components is displayed along with part information such as price, manufacturer, and performance characteristics. Simultaneously, the user may view the location of all such components within a 2-D or 3-D representation of the environment.

Figure 6A:
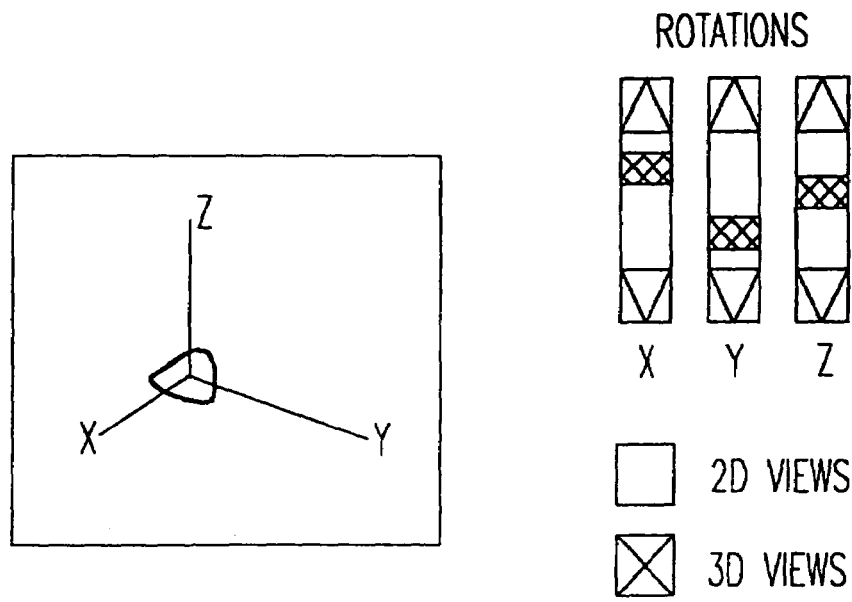
FIGS. 6a and 6b are display screens presented on the portable, hand-held computer which show editing of an antenna configuration in three dimensions.
Figure 6B:
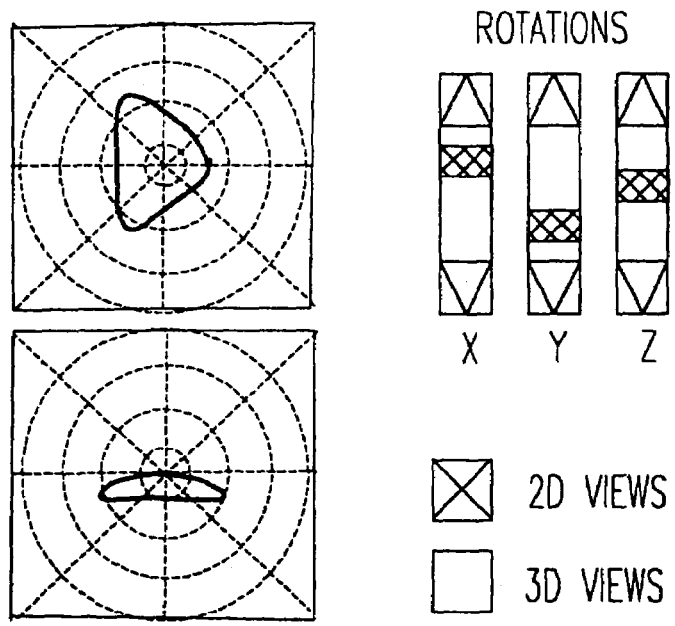

In addition to being able to display and manage a communication system's components, the present invention allows field engineers to modify a system's configuration while operating within the building or campus of buildings. Modifications such as removing, adding, or editing locations, positions or parameters of components are supported in the present embodiment. To remove a network component, the user simply taps or clicks once to select the object, and then specifies Remove Object from the Edit menu. To add a component, the user selects the Add Object from the Edit menu. A series of window dialogs, or forms, guides the user through the selection of a network component. The first few forms specify the general class of object such as wireless equipment, wired telephony component, optical fiber asset, etc. Later forms, based on the general class of component selected, vary such that specific information can be entered. For instance, in a wireless communications system, a base station may be placed within the active floor. In the same system, an antenna or cabling system can be placed to connect with the base station. Once components have been added to the building system, or if components already exist, the user may edit the configuration, layout, and properties of an object. To edit the network component properties, the user may tap or click on the object twice in succession, or, having tapped or clicked on the object once, choose the Properties command within the Edit menu. A list of the current objects' properties is displayed.

Where possible, the user may edit the object's configuration or properties. For instance, an antenna system may have a certain rotation in three dimensions. A preferred embodiment allows the user to specify a new rotation and orientation by choosing rotation angles from each of the three primary spatial axes, all while displaying the antenna system in a wireframe 3-D view, as shown in FIGS. 6a and 6b. Specifically, FIG. 6a shows a three dimensional view where soft keys "x", "y" and "z" are used to edit the antenna configuration, and FIG. 6b shows two 2D views with the soft keys "x", "y" and "z" being used to edit the antenna's configuration.

Other components may also be edited or moved throughout the displayed environment depending on the changeable parameters available for the selected object. The technique for making these edits will depend on the software being used on the portable computer 10. An important feature of this invention is that the technician is permitted to make changes in parameters, components, locations, and orientations of components, on the fly at the site of installation for the communications network, while having the ability to communicate with a server with a wireless or wired link for updates to the environmental model. The portable handheld computer also stores and displays the updated environment model and the changed network configuration. Preferably, the technician will be provided with immediate information at the hand held computer based on prediction models being loaded thereon that will predict the effects of the modifications imposed or suggested by the technician. Alternatively, this computation could be performed at the server wherein the hand held computer uploads the information, computations are performed, and the server downloads the results to the client computer. The modifications can be uploaded to one or more server computers, or they may be transmitted to other portable, hand-held client computers (one might have a plurality of hand-held client computers in the system, for example, if several engineers are working at optimizing and/or deploying the communications network at the same site.

Figure 7:
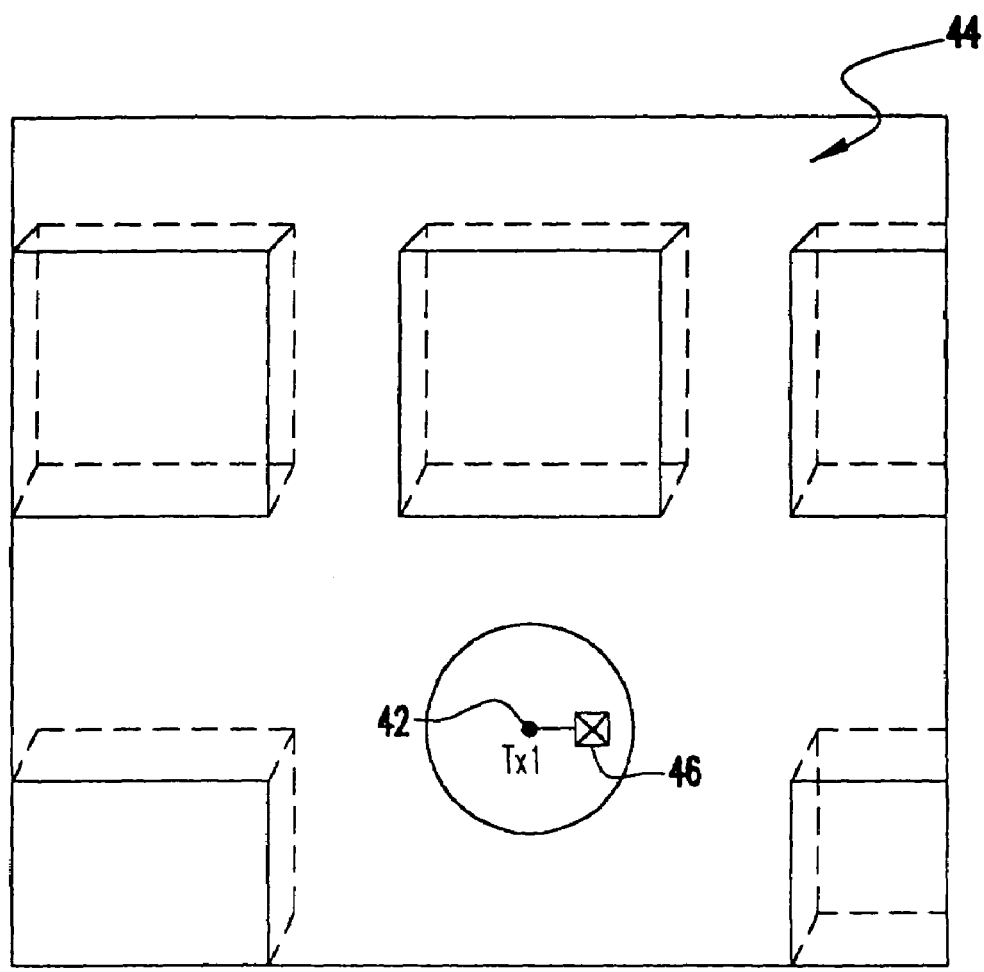
FIG. 7 shows the use of a translation handle to move a component such as a base station to a new location within a floor plan presented on the screen of the hand-held computer in 3-D.

Nearly all objects may be moved while viewing the building floor in the present embodiment. Referring now to FIG. 7, there is shown a communications component 42 positioned at a location on a floor of a building, with the floor plan shown generally as 44. To move the component 42, the user selects the desired object by tapping or clicking on the object's drawn location. Depending on the type of component 42, a set of modification or translation handles are presented. All objects will have translation handles used to move the component within the drawing while keeping the current orientation and layout. For instance, when a base station (component 42) is selected, a box 46 with an X inside can be displayed next to the base station. The user may click or tap on the box 46 and drag the pointing device around to specify a new location for the base station. Other components work in an identical fashion for merely translating the object.

Figure 8:
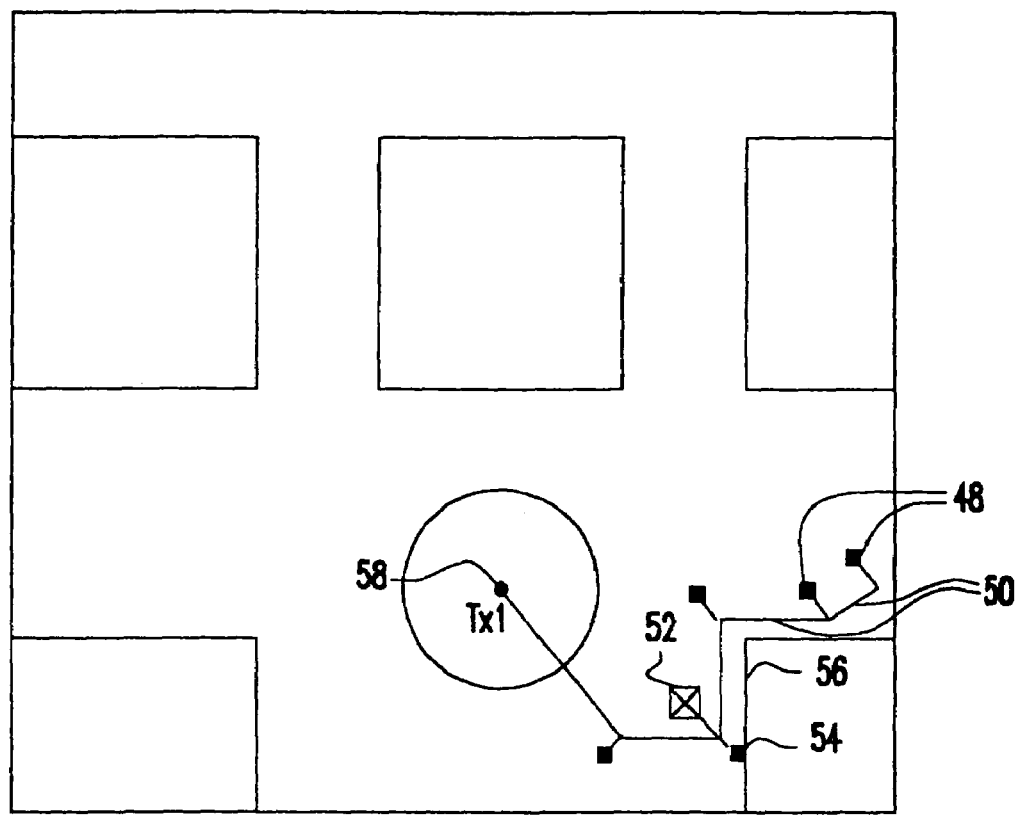
FIG. 8 shows the ability to alter the position and layout of a component such as a cable as it is displayed on a floor plan presented on the screen of the hand held computer.

Some components may be re-oriented on the display screen. For example, a cable system may be altered in the manner it is routed within a building. As shown in FIG. 8, the user can be shown a solid box 48 at each vertex of the cable system 50. Tapping or clicking on the solid box and dragging the pointing device around causes the vertex location to change. For illustrative purposes, FIG. 8 shows the translation handle 52 connected to vertex 54 of the cable which will allow this vertex to be moved from the wall 56. The end of the cable 50 is connected to component 58 which can also be moved as described above in connection with FIG. 7. In a preferred embodiment, the user may additionally select a Force Size constraints option with the Options menu to force any changes to a cable system to use the existing lengths of cable. Other techniques may also be used for addressing the movement and/or repositioning of cables and the like. An important feature of this invention is that the cable position, or "proposed" cable position, is identified to the technician on his or her portable hand held computer, and he or she may re-position the cable into alternative positions based on his or her on-site assessment of the building or other structure or geographical area in which the cable will be located. As discussed in conjunction with FIG. 7, and FIGS. 6a and 6b, this invention allows both the location and orientation to be altered on-site in a similar fashion, and still further, the invention allows for the selection of diverse components (e.g., selection of a particular type of antenna from a schedule of several different antennas) for installation at the site, with all of these selections being made possible at the site by the technician, and the technician is provided with immediate feedback on how these changes will affect the overall communications system. Examples of the types of components which are used in practice and which might be modeled within the practice of this invention include base stations, base station controllers, amplifiers, attenuators, antennas, coaxial cabling, fiber optic cabling, connectors, splitters, repeaters, couplers, leaky feeder cables, hubs, switches, routers, firewalls, power distribution lines, copper wiring, twisted pair cabling, and wireless access points. In addition, transducers and converters such as devices that convert optical signals to RF or baseband signals might be modeled. The portable computer/server combination may also track the cost and performance criteria (i.e., a bill of materials) for various components selected by or substituted by the engineer using the hand held computer, such that a complete listing and display of charges and performance can be obtained during the design, deployment or optimization processes.

Existing software systems may allow a user to view communications network systems. However, prior to this invention, no prior art system allowed the management described above to occur on a portable hand-held computer. This invention is the first to recognize that portable hand held computer systems can be used to store and present three dimensional representations of buildings, campus areas, topography of geographic terrain, etc., and to allow these displayed systems to be modified on the fly, with immediate computational feedback from downloaded models, thereby permitting the fast and efficient deployment and optimization of communications networks.

With reference to FIGS. 2 and 4–8, it can be seen that the present invention contemplates that multiple floor plans may be stored either on the portable computer or server (in which case the portable computer can retrieve these plans from the server), and that these floor plans can be displayed on the portable computer (either in 2-D or 3-D). The engineer will be able to select among one or more buildings (as shown in FIG. 2), and then be able to display the floor plan for specific floors in a multi-story building selected (or the floor plan for a single story building) on the display of the portable computer. As shown in FIG. 5, the engineer can then selectively display different portions of the floor plan by moving the view port. It should be understood that these techniques can be used in any physical environment which is modeled in a three-dimensional model (e.g., topographical terrain, etc.).

The WPD file format contemplated herein is capable of representing the complete building and network database information. In the present embodiment, when a user adds, removes, or modifies a network component configuration and uploads this information to a computer running SitePlanner®, the SitePlanner® software can completely reconstruct and store a .dwg file with all the necessary data such that the user may use the SitePlanner® tools to further a design on the desktop PC. To reconstruct the .dwg file within SitePlanner® the process for exporting the WPD file is reversed. That is, the look-up table (LUT) described previously is reversed, and opcodes and operands contained in the WPD files are translated into the .dwg representations.

In one embodiment, to upload WPD database files from the portable handheld computer onto a server which could be a desktop PC, the user places the portable handheld computer into the docking cradle attached to the desktop PC. Extensions made to the SitePlanner tool suite guide the user through the import process. The WPD database files contained on the portable handheld computer are queried, that is, the desktop PC software requests a list of database files marked as type WPDB as discussed previously. The list returned is presented to the user for selection. In the current embodiment, the databases selected by the user are transferred from the portable handheld computer onto the desktop PC via the serial port interface. Using the aforementioned translation process, .dwg files are reconstructed for each WPD file transferred.

Figure 9:
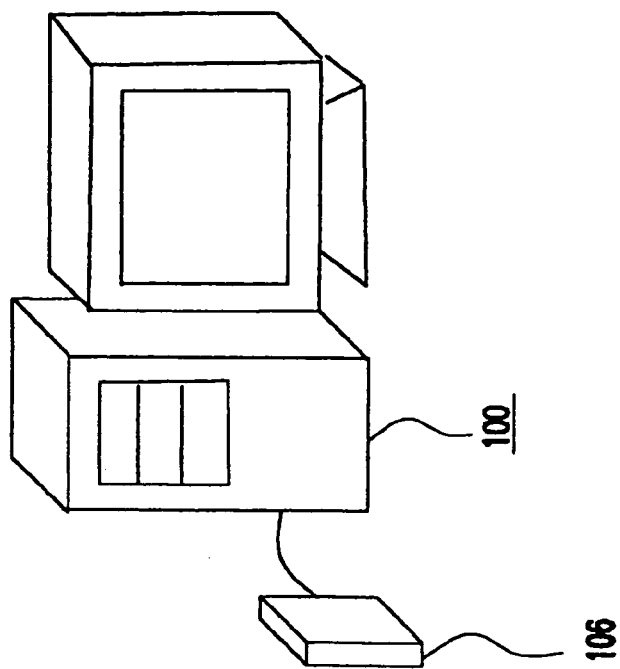
FIG. 9 is a schematic diagram illustrating the communication links between the portable handle client computer and the server computer.
Figure 9:
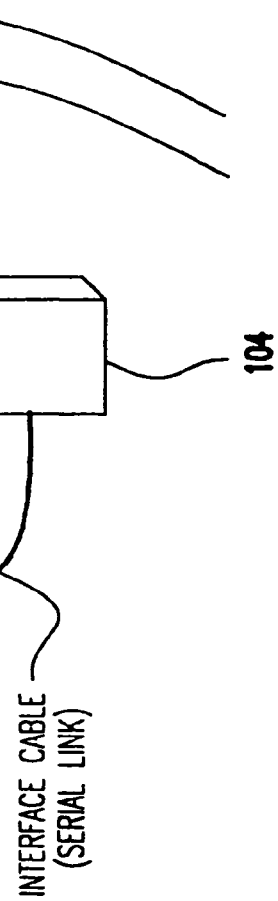

In addition to being able to transfer, display and store data between the portable hand-held client and other client or server computers via a serial port interface (the serial port 60 being shown in FIG. 1), the present invention also contemplates a novel method for transferring, storing and displaying data in the field over a wired or wireless network medium, as shown in FIG. 9. Using such a method, the field engineer may communicate design changes back to a desktop PC 100 running SitePlanner® or some other capable software for other engineers to examine in real-time or off-line. To minimize the quantity of transferred data, a method of tracking revision changes could be employed. Preferably, the WPD file format employs change-tracking opcodes, such that only the data marked as changed needs to be sent over the communication link. When the user opens a communication link to a desktop PC 100 running SitePlanner® or some other capable software, a copy of the WPD file is stored locally to the desktop PC 100 such that any changes made using the portable handheld computer 102 will be merged into the copy stored locally on the desktop PC 100. Other users may not modify the database files on the desktop PC while the communication link remains open, preventing multiple users from making changes to the file at once.

It is also possible, and preferable to have the facility of allowing a mobile user to communicate site-specific information back to a central server or repository. Autodesk, Inc. has developed the OnSite technology that allows a field technician to carry a portable handheld computer into the field and visualize a Geographic Information System (GIS) database of street maps. The field technician may then place survey information within the database and transmit the information to a server over a wired or wireless link. The present embodiment extends this concept significantly in that the current invention allows for 3-D physical environment information to be sent into the field, and also allows for complex communications network information and measured and predicted performance data to be viewed, manipulated, stored and transmitted back to another computer over a wired to wireless link. In the preferred embodiment, a position-tracking device may be attached to or incorporated in the portable handheld computer 102 so that a user's movements within the environment may be tracked and displayed. Using such a system, a field technician will know precise location information while navigating through an environment. Some examples of position-tracking devices include Global Positioning System (GPS) antennas, laser range finder scanners, tilt sensor based dead-reckoning systems, or some other positioning device known now or in the future. Interface boxes 104 and 106 allow this information, as well as other data, to be transmitted between the portable hand held computer 102 and the server computer 100. For example, after the technician makes changes on the portable hand held computer 102, this information could be used to update the computerized model of the communications network on the server 100. Alternatively, files of building information, equipment information, etc., might be retrieved from the server 100 by the portable hand held computer 102 on an as needed basis.

There are many computer aided design (CAD) products on the market that can be used to design a computerized model of a communications network. Some of the major prediction and simulation tools available are: WiSE from Lucent Technology, Inc., SignalPro from EDX, PLAnet by Mobile Systems International, Inc., TEMS from Ericsson, Virtutech Simics, CACI Products Co.'s COMNET Predictor, Scientific and Engineering Software, Inc.'s SES/Strategizer, and Make System, Inc.'s NetMaker XA. In a preferred embodiment, SitePlanner® from Wireless Valley Communications, Inc. is used as a CAD tool to predict performance of a communications network system; however it should be understood that other design tools may also be used in the practice of this invention.

With advancements in portable handheld computing power, enhanced prediction and simulation capabilities may be possible on a portable handheld computer. The desktop PC running SitePlanner® or some other prediction software could additionally be a collection of computers used in parallel to improve calculation speed. In the present embodiment, the software on the portable handheld computer can send environmental information contained in a WPD database to multiple computers running SitePlanner® in parallel. Using a simulation or prediction tool such as SitePlanner to model the communications environment, the present invention allows simulation or prediction data to be communicated from a desktop PC or server PCs to the field engineer a portable handheld computer. In the present embodiment, the communication of simulation or prediction data may occur through the docking cradle connection, or over the aforementioned wired or wireless network connection. The prediction or simulation data is embedded directly within the WPD database files, and then stored and displayed on the portable handheld computer, as discussed in the WPD specification.

Using the present invention, a user may view simulation or prediction data within the building database map on the portable handheld computer. Simulation or prediction data may be represented as signal strength, network throughput, bit error rate, packet error rate, packet latency, power consumption, or some other measurement metric known now or in the future. Simulation or prediction data may be viewed either as an overlaid grid of data points, as a set of contours identifying equal performance, as an instant point where a simulated user is tracked within the building to indicate communications performance, or some other display method known now or in the future. Examples of several network performance visualization methods are covered in pending application Ser. No. 09/352,678 filed Jul. 14, 1999, the complete contents of which is herein incorporated by reference.

Regardless of communication system complexity or scale, measurement data is generally required to validate the communication system design and operation, and to verify proper performance over time. Many tools exist on the market today for validating the performance of communications networks. Hardware and software products for verifying wireless communications include, but are certainly not limited to, TEMS Light from Ericsson, the Agilent Technologies, Inc. Indoor Wireless Measurement System, the Wireless Valley Communications, Inc. InFielder™ component within SitePlanner®, the SAFCO Walkabout®, and the Qualcomm Retriever. Countless tools for monitoring wired network performance exist. Examples include the NetSys Performance Tool, IBM's NetView, HP's OpenView, the Fluke OneTouch Network Assistant, and many more. None of the above-mentioned products, except for InFielder™, have the ability to remotely monitor network performance while merging performance data with exact physical locations and electrical specifications of the components that make up the network under test. While InFielder™ can be used to measure network performance between a client and a server, InFielder™ does not provide a means for transferring collected measurement data to another computer in a real-time or store-and-forward manner. In hand-held devices, where display capabilities and memory size may be severely limited, it is vital to have a real-time or near real-time transfer mechanism that allows measured data from the hand held client to be off-loaded to a server before the memory of the hand held device is filled. At the server, the received data may be archived, displayed, used for remote engineering monitoring of system health, or used for analysis. The received data may also be stored and displayed at the originating hand held device provided there is sufficient memory.

Some communication devices such as wired or wireless modems, wired or wireless LAN adapters, cellular telephones, and others can be used to gain insight into the performance of a network. For instance, some existing wireless LAN adapters can report connection quality to the user via a software interface. Most cellular telephones are capable of indicating signal strength, and some can report base station ID, bit error rate, and other statistics to indicate performance of the network. The present invention preferably uses capabilities of such devices for passively or autonomously reporting communication network performance to one or more servers or clients. That is, as users roam an environment with the hand held computer 102 and a communication device such as those mentioned above, the software logs connection quality, characteristics, and statistics where available. Using the bandwidth-efficient WPD file format, the system utilizes the wired or wireless communications link to send the logged data to other mobile users or to servers, such as desktop PCs, for analysis. Such a system can be used without having location information, simply reporting the general communications network performance and status from a roaming user. Furthermore, the hand held clients may be left unattended for ongoing, periodic data collection, storage, or transferral. By sending many users into the field with the present invention, a multitude of performance measurement samples indicating network performance such as throughput, latency, delay, error rate, power consumption, signal level, interference, distortion, quality of service, and others, can be gathered periodically, intermittently, or continuously to monitor the state of the network.

Figure 10:
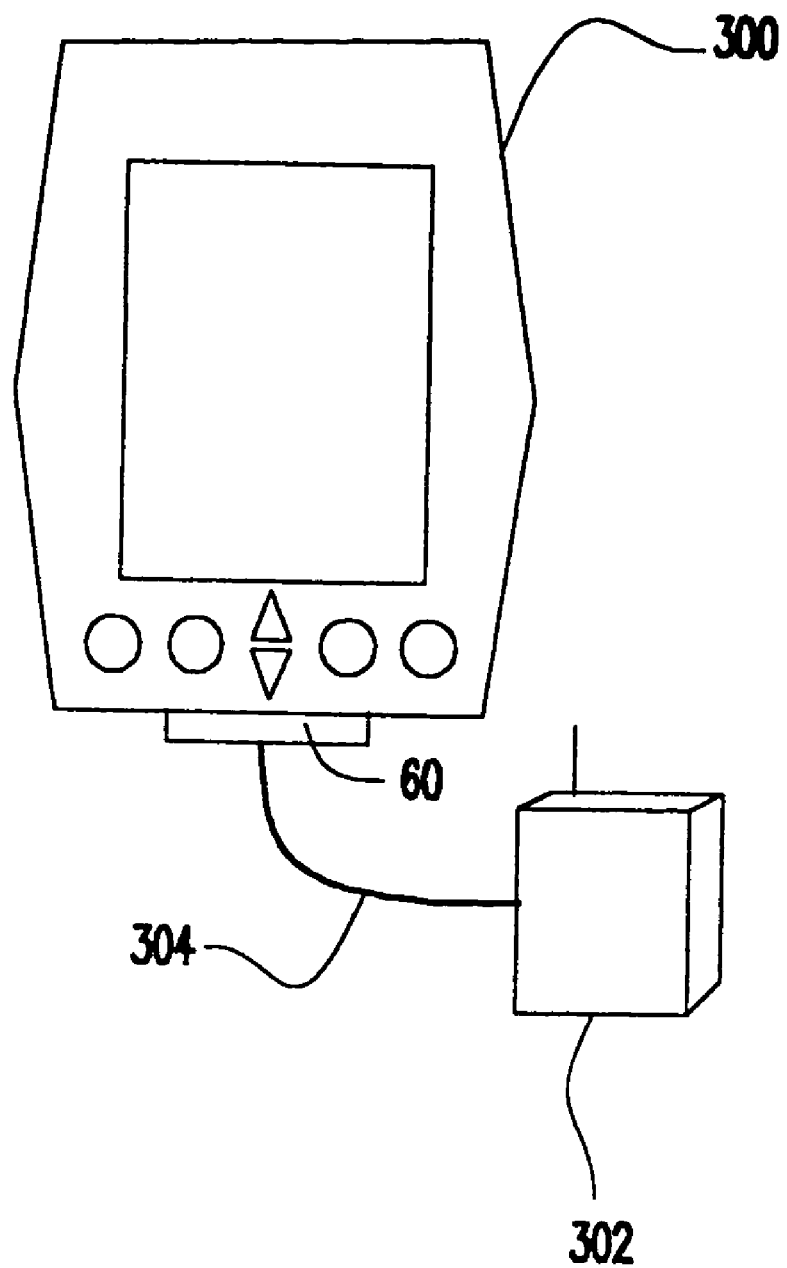
FIG. 10 is a schematic diagram showing the portable hand held computer equipped with a measurement device.

The present embodiment also allows for a field engineer or technician to enter a site and actively report their location while collecting data. Referring now to FIG. 10, in the present invention, a user operating a portable hand-held computer 300 may attach a communication system measurement device, such as a wired or wireless network transceiver, a cable integrity tester, a signal quality measurement device, a bit error rate or data throughput detector, or some other measurement tool 302 known now or in the future. In the present embodiment, specific examples of measurement devices that may be attached include, but are not limited to, the ZK-Celltest SAM with cellular phone, the Wireless Valley Communications, Inc. WaveSpy radio scanner, the Anritsu SiteMaster MS2711 handheld spectrum analyzer, a Berkeley Varitronics Systems, Inc. Fox radio receiver, and a wireless Palm Modem. The measurement tool may be connected by an interface cable 304 to the interface port 60, or by other suitable wired or wireless connection.

Having connected a communication measurement device 302 to a portable handheld computer 300, the preferred embodiment will guide the engineer through a series of steps before beginning measurement collection with the communications device. The user should input specific device parameters so that the measurement device may be set up properly. Some measurement equipment devices have real-time interfaces, where the portable handheld computer can interface directly to the measurement device and potentially directly select options and parameters for the measurement equipment. Other measurement devices require the user to select options manually with an interface on the device itself. If a real-time interface is present on the measurement device 302, the options and parameters pertaining to the selected measurement device may be transmitted over the communications link between the portable handheld computer and the measurement device. In another embodiment, as is shown in FIG. 10, an RS-232 serial interface cable 304 is used to connect the portable handheld computer 300 with the measurement device 302; however, one skilled in the art would observe that other communications links could be used such as USB serial, FireWire, a BlueTooth wireless system, or some other communications link known now or in the future could also be employed. In the embodiment shown in FIG. 10, RS-232 serial communications are preferably managed using the Palm OS's New Serial Manager specified as part of the Palm OS Programmers Companion. The New Serial Manager handles low-level implementation details for communications between the software running on the portable computer 300 and the serial port on the portable handheld computer 300. The Palm OS software development kit implements function calls to send data over the serial port using the New Serial Manager. Further details on the Palm OS New Serial Manager and how PalmFielder uses the serial connection are detailed as part of the Palm OS software development kit reference document. Once a measurement device has been connected to the portable handheld computer and the user has specified the desired options and parameters for the device, data collection and remote monitoring by another server or client may begin. When using a measurement device equipped with a real-time interface, data collection can be performed in the background while the user navigates within the building or places the measurement device in a fixed location. With some measurement devices, data will be stored in the WPD file at all times using a time or position code to indicate when or where the data was collected. The WPD specification indicates how measurement data is stored in a WPD file.

As disclosed in the co-pending application Ser. No. 09/221,985, the complete contents of which has been incorporated by reference, the user may input the current location into the portable hand-held computer 300 using several methods. In a marker mode, the user taps or clicks at the current location and a single measurement is made using the attached testing device. In a track mode, the user indicates the current position by clicking or tapping on the display, then walking in a straight line at constant velocity, and then clicking or tapping to indicate the stopping position. The data collected during the traveling period may then be averaged according to user specified options and stored within the database at evenly distributed points along the path either by using a set time interval or unit distance.

In an "Auto" mode, the user attaches a position-tracking device such as a GPS antenna, a laser range finder, a tilt sensor based dead-reckoning system, or some other tracking device that can detect position or change in position or motion known now or in the future. As the field user moves around in the environment, measurements collected from a receiver are correlated with position information collected from the attached tracking device. Such a system can be used to record large amounts of data with minimal user interaction needed. As a user of the hand held client collects measurement data within the environment, the collected data may be transmitted in real-time or near real-time to a remote server computer or another client, and the measured data is then displayed on a 3D model of the environment at the remote computer. The data is also logged and processed at the remote computer for archiving and analysis.

Measurement data stored in the WPD file can be displayed directly on the building map by using a colored or patterned marker such as a circle, rectangle, asterisk, or some other shape at the position the data was recorded. In the case where prediction or simulation data is also available for the building, the user preferably may choose to display the prediction or simulation data along side actual measurements. The current embodiment also allows the user to show markers and statistics directly on the building drawing indicating differences between predicted or simulated data and actual measurement data.

An important component of the SitePlanner® tool suite is the Optimatic® module, where measurement data is used to optimize both the prediction model and the prediction model parameters. The portable system contemplated by this invention can be adapted to be used to optimize the prediction model and prediction model parameters on-site on the fly at the discretion of the engineer. FIG. 9 shows a system for transferring measurement data over a wired or wireless communications medium. Using the communication link mentioned previously, where a desktop PC server running SitePlanner® or other capable software is connected via a wired or wireless communications medium, the collected measurement data may be sent to the desktop PC for optimization of the prediction or simulation model or model parameters. Once the desktop PC has optimized the prediction or simulation model or model parameters, updated predictions are made, and the new predictions are sent back to the portable handheld computer over the aforementioned communications link. Given more processing power on the portable handheld computer, optimizations could take place directly on the portable handheld computer.

The system of this invention preferably allows for management of a measurement campaign within a given environment. If several field technicians collect measurement data using the present invention system, each user may exchange the data collected with other users in the field. Alternatively, unmanned operation of the present invention could be employed. Such a system facilitates the management of an ongoing measurement campaign by effectively allowing measurement collection to operate in parallel. To upload measurement data collected in the field, the aforementioned wired or wireless link is used to send data from the portable handheld computer to other portable handheld computers in the field or to desktop PCs elsewhere.

Using the present invention, a field engineer is capable of completing the entire design, deployment, test, optimization, and maintenance cycle required to implement successful communications networks. Representing a significant advance over the prior art, an exemplary embodiment allows the engineer to remain in the field while deploying the communications network, making measurements within the network, receiving optimized predictions on the performance of the network, re-configuring the communications network and associated components, and repeating the entire cycle to achieve maximum possible performance with minimal required time or effort.

While the invention has been described in terms of its preferred embodiments, those skilled in the art will recognize that the invention can be practiced with considerable variation within the scope of the appended claims.

We claim:

1. A computerized system for designing, deploying, optimizing, modifying, or maintaining a communications network, comprising:
    a computerized model representing a physical environment in which said communications network is or will be deployed, said computerized model providing at least one site specific representation of locations of one or more components within said physical environment;
    a server computer or computers for running a computer program which uses said computerized model;
    at least one portable computer which acts as a client to said server computer or computers, said at least one portable computer being able to download, upload or store at least a portion of said at least one site specific representation to or from said server computer or computers;
    at least one measurement device for measuring performance measurements within said physical environment, said at least one measurement device being associated with said at least one portable computer,
    wherein performance measurements made with said measurement device are communicated to said server computer or computers and can be correlated with location information where said performance measurements are made; and
    a display for displaying predicted or simulated data or measurement data, and wherein said display represents markers or statistics on a building drawing or floor plan which indicate differences between predicted or simulated data and actual measurement data.

2. The computerized system of claim 1 wherein said measurement device is positioned inside or is part of said at least one portable computer.

3. The computerized system of claim 1 wherein said measurement device is connected to said at least one portable computer.

4. The computerized system of claim 1 wherein said at least one portable computer can download or upload performance measurements, predictions, or equipment modifications to or from said server computer or computers.

5. The computerized system of claim 1 wherein said at least one portable computer can download or upload performance measurements, predictions or equipment modifications to or from another computer which is different from said server computer or computers.

6. The computerized system of claim 1 wherein said at least one portable computer has a display.

7. The computerized system of claim 1 wherein said server computer or computers or said at least one portable computer can be used to input changes to at least a portion of said at least one site specific representation.

8. The computerized system of claim 7 wherein said changes that are input with said server computer or computers or said at least one portable computer modify a representation of a configuration of said communications network.

9. The computerized system of claim 7 wherein efficient change tracking is employed.

10. The computerized system of claim 1 further comprising:
    a means for updating predicted performance parameters for a communications network.

11. The computerized system of claim 1 wherein said communications network includes wireless communication devices.

12. The computerized system of claim 1 wherein said at least one portable computer is a hand-held computer.

13. The computerized system of claim 1 wherein said at least one site specific representation is three dimensional.

14. The computerized system of claim 13 wherein said at least one site specific representation is constructed from a series of two dimensional representations.

15. The computerized system of claim 1 wherein said physical environment is a building and said at least one site specific representation includes at least one floor plan of said building.

16. The computerized system of claim 15 wherein said at least one site specific representation includes a plurality of floor plans for a plurality of floors in said building, and wherein said at least one portable computer can be used for selecting specific floor plans of said plurality of floors for displaying on a display.

17. The computerized system of claim 1 wherein said physical environment is a campus of buildings and said at least one site specific representation includes at least one floor plan for one or more buildings of said campus, and wherein said at least one portable computer can be used for selecting a building within said campus of buildings and display, on a display associated with either or both said at least one portable computer or said server computer or computers, said at least one floor plan for said building selected.

18. The computerized system of claim 15 wherein said at least one site specific representation includes a plurality of floor plans for a plurality of floors for said building.

19. The computerized system of claim 1 wherein components are selected from the group consisting of one or more of base stations, base station controllers, amplifiers, attenuators, antennas, coaxial cabling, fiber optic cabling, connectors, splitters, repeaters, transducers, converters, couplers, leaky feeder cables, hubs, switches, routers, firewalls, power distribution lines, copper wiring, twisted pair cabling, or wireless access points.

20. The computerized system of claim 1 wherein said computerized model represents an outdoor environment in two dimensions or three dimensions.

21. The computerized system of claim 1 further comprising a position-tracking device used to determine position within said physical environment.

22. The computerized system of claim 1 wherein said communication network components are maintained in a bill of materials.

23. The computerized system of claim 1 wherein said at least one measurement device operates in an un-manned fashion.

24. The computerized system of claim 1 further comprising at least one display at either said server computer or computers or said at least one portable computer.

25. The computerized system of claim 1 wherein said server computer or computers or said at least one portable computer can be used to input changes to said computerized model.

26. The computerized system of claim 25 wherein said changes that are input with said server computer or computers or said at least one portable computer modify a representation of a configuration of said communications network.

27. The computerized system of claim 25 wherein efficient change tracking is employed.

28. The computerized system of claim 1 wherein either or both said at least one measurement device or said at least one portable computer is operated without human intervention.

29. The computerized system of claim 1 wherein either or both said at least one measurement device or said at least one portable computer is positioned at a fixed location, and wherein either or both said at least one measurement device or said at least one portable computer can be used to passively or autonomously report communication network performance to said server computer or computers, or one or more client computers, or one or more other computers.

30. The computerized system of claim 1 wherein performance measurements are correlated to position information.

31. The computerized system of claim 1 wherein one or more site specific data are communicated between a server computer or computers and said at least one portable computer or another computer, wherein said site specific data includes one or more of network information, measured data, and predicted data, and wherein said site specific data are capable of being processed or analyzed remotely, and of being updated so as to allow new, updated, performance predictions to be communicated between said server computer or computers and said at least one portable computer or another computer.

32. The computerized system of claim 1 further comprising a display for displaying simulated or predicted data as one of a) a grid of data points, b) one or more contours identifying equal performance, or c) one or more points where a simulated user is tracked within a building.

33. The computerized system of claim 1 further comprising a position-tracking or locationing system, and which displays one or more comparisons of measured position-location with predicted or simulated position-location at either said server computer or said one or more portable computers or other computers.

34. A computerized system for designing, deploying, optimizing, modifying or maintaining a communications network, comprising:
   a computer generated model representing a physical environment in which said communications network is or will be deployed, said computer generated model either or both
   (A) providing a three-dimensional representation of locations of components within said physical environment, or
   (B) providing a representation of locations of components within said physical environment which is either two dimensional or three dimensional, and wherein said computer generated model is used for performance prediction of said communications network based on one or more factors selected from the group consisting of choice of components to be used within said physical environment, choice of parameters of said components, choice of locations for said components within said physical environment, and orientation of said components at said locations;
   a server computer or computers for running a computer program which uses said computer generated model;
   at least one portable computer which acts as a client to said server, said at least one portable computer can download, upload or store data representing at least a portion of said computer generated model;
   at least one measurement device associated with said at least one portable computer for measuring performance measurements or metrics within said physical environment, wherein either or both said at least one measurement device or said at least one portable computer communicates said performance measurements or metrics to said server computer or computers and
   a display for displaying predicted or simulated data or measurement data, and wherein said display presents markers or statistics on a building drawing or floor plan which indicate differences between predicted or simulated data and actual measurement data.

35. The computerized system of claim 34 further comprising a display associated with said server computer or computers or said at least one portable computer.

36. The computerized system of claim 34 wherein said measurement device is connected to, contained within, or interfaceable with said at least one portable computer.

37. The computerized system of claim 34 wherein said server computer or computers or said at least one portable computer can upload or download one or more of said performance measurements or metrics, predictions of performance for a communications network which is or will be installed in said physical environment, or said data representing said at least a portion of said computer generated model to or from said at least one portable computer, said server computer or computers, or another computer.

38. The computerized system of claim 34 wherein updating, modifying, logging, storing or archiving can be performed at said server computer or computers.

39. The computerized system of claim 34 wherein said server computer or computers or said at least one portable computer can be used to input changes to data representing at least a portion of said computer generated model.

40. The computerized system of claim 39 wherein efficient change tracking is employed.

41. The computerized system of claim 39 wherein said changes that are input with said server computer or computers or said at least one portable computer modify a representation of a configuration of said communications network.

42. The computerized system of claim 34 wherein said server computer or computers or said at least one portable computer can communicate either or both predicted or measured performance measurements or metrics.

43. The computerized system of claim 34 wherein said at least one portable computer comprises an input device for inputting changes to at least a portion of said data representing said computer generated model.

44. The computerized system of claim 43 further comprising an editor for making said changes.

45. The computerized system of claim 34 wherein said at least one portable computer performs or controls at least one of a) performance predictions, b) measurements, c) analysis of cost data of components or network infrastructure, and d) tracking network equipment changes.

46. The computerized system of claim 34 wherein said at least one portable computer can upload or download changes to or from said server computer or computers or to or from another computer.

47. The computerized system of claim 34 further comprising at least one of a display or storage device for displaying or storing, respectively, said changes at either said server computer or computers or said at least one portable computer or said another portable computer.

48. The computerized system of claim 34 wherein communication of simulation or prediction or measurement data occurs through one of a docking cradle connection, a wireless connection, a wired connection, or via electronic media.

49. The computerized system of claim 34 wherein said at least one portable computer includes a plurality of portable computers, and wherein either or both predicted or measured performance measurements or metrics may be communicated between said server computer or computers and said plurality of portable computers.

50. The computerized system of claim 34 wherein said at least one portable computer provides data to said server computer or computers, and said server computer or computers processes provided data to provide a modified result.

51. The computerized system of claim 50 where said modified result is communicated to said at least one portable computer.

52. The computerized system of claim 34 wherein said components include at least one communication network component, and wherein a cost of a communication network component of said at least one communication network component may be tracked, shared, revised, or substituted.

53. The computerized system of claim 34 wherein said components include at least one communication network component, and wherein a performance attribute of a communication network component of said at least one communication network component may be tracked, shared, revised or substituted.

54. The computerized system of claim 34 wherein a maintenance record in either or both said server computer or computers or said at least one portable computer may be tracked, shared, revised or substituted.

55. The computerized system of claim 34 wherein said components include at least one communication network component, and wherein a location or orientation of a communication network component of said at least one communication network component may be tracked, shared, revised or substituted.

56. The computerized system of claim 34 wherein said three dimensional representation is represented as one or more two dimensional representations.

57. The computerized system of claim 34 wherein said computer generated model provides a two dimensional or three dimensional representation based upon at least one floor plan of a building.

58. The computerized system of claim 57 wherein said computer generated model provides two dimensional or three dimensional representations based upon a plurality of floor plans for one or more floors for one or more buildings.

59. The computerized system of claim 58 wherein said server computer or computers or said at least one portable computer can be used to select one or more floor plans or one or more buildings for display, measurement or prediction operations.

60. The computerized system of claim 34 wherein components represented in said computer generated model are selected from the group consisting of one or more of base stations, base station controllers, amplifiers, attenuators, antennas, coaxial cabling, fiber optic cabling, splitters, repeaters, transducers, converters, couplers, leaky feeder cables, hubs, switches, routers, firewalls, power distribution lines, copper wiring, twisted pair cabling or wireless access points.

61. The computerized system of claim 34 wherein said communications network includes wireless communication devices.

62. The computerized system of claim 34 wherein said computer generated model represents an outdoor environment in two dimensions or three dimensions.

63. The computerized system of claim 34 further comprising a position location system or device for identifying a location of said at least one portable computer within said physical environment.

64. The computerized system of claim 34 further comprising a position-tracking or locationing device for locating said at least one portable computer or measurement device.

65. The computerized system of claim 34 wherein said server computer or computers or said at least one portable computer can be used to alter a layout of components.

66. The computerized system of claim 34 wherein said at least one measurement device makes performance measurements in said physical environment on an automated or un-manned basis.

67. The computerized system of claim 34 wherein said computer generated model represents at least one of objects in a building or their locations, communications component data and their location, building information or properties, radio propagation properties, bill of materials data, environmental data, cost data, or asset management data.

68. The computerized system of claim 34 wherein said display can display one or more of location information, predictions, measurements, and at least a portion of said site specific representation.

69. The computerized system of claim 34 wherein either or both said at least one measurement device or said at least one portable computer is positioned at a fixed location, and wherein either or both said at least one measurement device or said at least one portable computer can be used to passively or autonomously report communication network performance to said server computer or computers, or one or more client computers, or one or more other computers.

70. The computerized system of claim 34 wherein performance measurements are correlated to position information.

71. The computerized system of claim 34 wherein one or more site specific data are communicated between a server computer or computers and said at least one portable computer or another computer, wherein said site specific data includes one or more of network information, measured data, and predicted data, and wherein said site specific data are capable of being processed or analyzed remotely, and of being updated so as to allow new, updated, performance predictions to be communicated between said server computer or computers and said at least one portable computer or another computer.

72. The computerized system of claim 34 further comprising a display for displaying simulated or predicted data as one of a) a grid of data points, b) one or more contours identifying equal performance, or c) one or more points where a simulated user is tracked within a building.

73. The computerized system of claim 34 further comprising a position-tracking system which allows movements of one or more users within said physical environment to be tracked and displayed.

74. A computerized system for designing, deploying, optimizing, modifying or maintaining a communications network, comprising:

a site specific computer implemented model representing a physical environment in which a communications network is or may be deployed, said site specific computer implemented model providing a representation of one or more components or physical objects, said site specific computer implemented model is used for performance prediction of a communications network based on one or more factors selected from the group consisting of choice of components to be used within said physical environment, choice of parameters of said components, choice of locations for said components within said physical environment, and orientation of said components at said locations;

a server computer or computers for running a computer program which uses said site specific computer implemented model;

at least one portable computer which acts as a client to said server computer or computers, said at least one portable computer can download, upload or store a representation of at least a portion of said site specific computer implemented model from said server computer or computers;

at least one measurement device for measuring one or more performance measurements or metrics within said physical environment, said measurement device being associated with said at least one portable computer, and wherein said at least one portable computer communicates said one or more performance measurements or metrics measured by said measurement device to said server computer or computers, and a display for displaying predicted or simulated data or measurement data, and wherein said display presents markers or statistics on a building drawing or floor plan which indicate differences between predicted or simulated data and actual measurement data.

75. The computerized system of claim 74 wherein said at least one portable computer is a hand-held computer.

76. The computerized system of claim 74 wherein said site specific computer implemented model provides a three-dimensional representation of said physical environment.

77. The computerized system of claim 74 wherein said physical environment is a building and said site specific computer implemented model includes a two or three dimensional representation of at least one floor plan of said building.

78. The computerized system of claim 77 wherein said site specific computer implemented model includes two or three dimensional representations of a plurality of floor plans for a plurality of floors in said building.

79. The computerized system of claim 78 wherein said at least one portable computer can be used to select specific floors plans from said plurality of floor plans.

80. The computerized system of claim 74 wherein said physical environment is a campus of buildings and said representation provided by said site specific computer generated model includes at least one floor plan for each of a plurality of buildings in said campus, and wherein said at least one portable computer can be used to select a building within said campus of buildings.

81. The computerized system of claim 80 wherein said representation provided by said site specific computer implemented model includes a plurality of floor plans for a plurality of floors for a building of said campus of buildings.

82. The computerized system of claim 74 wherein said components are selected from the group consisting of one or more of base stations, base station controllers, amplifiers, attenuators, antennas, coaxial cabling, fiber optic cabling, connectors, splitters, repeaters, transducers, converters, couplers, leaky feeder cables, hubs, switches, routers, firewalls, power distribution lines, copper wiring, twisted pair cabling, or wireless access points.

83. The computerized system of claim 74 wherein said communications network includes wireless communication devices.

84. The computerized system of claim 74 wherein said physical environment is an outdoor environment.

85. The computerized system of claim 74 further comprising a position-tracking device used to determine a position of said at least one portable computer or said measurement device within said physical environment.

86. The computerized system of claim 74 wherein said communication network components are maintained in a bill of materials.

87. The computerized system of claim 74 further comprising a display associated with said at least one portable computer or said server computer or computers.

88. The computerized system of claim 74
wherein said server computer or computers or said at least one portable computer can be used to input changes to said factors used in said site specific computer implemented model.

89. The computerized system of claim 88 wherein said changes that are input with said server computer or computers or said at least one portable computer modify a representation of a configuration of said communications network.

90. The computerized system of claim 74 wherein said server computer or computers updates said site specific computer implemented model of said physical environment to include said one or more performance measurements or metrics.

91. The computerized system of claim 74 wherein either or both said at least one measurement device or said at least one portable computer is operated without human intervention.

92. The computerized system of claim 74 wherein either or both said at least one measurement device or said at least one portable computer is positioned at a fixed location, and wherein either or both said at least one measurement device or said at least one portable computer can be used to passively or autonomously report communication network performance to said server computer or computers, or one or more client computers, or one or more other computers.

93. The computerized system of claim 74 wherein performance measurements are correlated to position information.

94. The computerized system of claim 74 wherein one or more site specific data are communicated between a server computer or computers and said at least one portable computer or another computer, wherein said site specific data includes one or more of network information, measured data, and predicted data, and wherein said site specific data are capable of being processed or analyzed remotely, and of being updated so as to allow new, updated, performance predictions to be communicated between said server computer or computers and said at least one portable computer or another computer.

95. The computerized system of claim 74 further comprising a display for displaying simulated or predicted data as one of a) a grid of data points, b) one or more contours identifying equal performance, or c) one or more points where a simulated user is tracked within a building.

96. The computerized system of claim 74 further comprising a position-tracking system which allows movements of one or more users within said physical environment to be tracked and displayed.

97. The computerized system of claim 74 wherein said computer implemented model represents at least one of objects in a building or their locations, communications component data and their location, building information or properties, radio propagation properties, bill of materials data, environmental data, cost data or asset management data.

98. A computerized system for designing, deploying, optimizing, modifying or maintaining a communications network, comprising:
 a computer implemented model which provides one or more representations of a physical environment in which a communications network is or may be deployed, said computer implemented model providing a representation representing locations of one or more components within said physical environment, said computer implemented model can be used for performance prediction of a communications network based on one or more factors selected from the group consisting of choice of components to be used within said physical environment, choice of parameters of said components, choice of locations for said components within said physical environment, and orientation of said components at said locations;
 a server computer or computers for running a computer program which uses said computer implemented model;
 at least one portable computer which can download, upload or store one or more representations of said computer implemented model from said server computer or computers, said at least one portable computer can be used to modify, using said one or more representations, one or more factors used in said computer implemented model, and can determine updated performance predictions based on modifications to said one or more factors, and
 wherein said at least one portable computer can upload modifications or updated performance predictions to said server computer or computers; and
 a position-tracking or locationing system, and a display which displays one or more comparisons of measured position-location with predicted or simulated position-location at either said server computer or computers, said at least one portable computer, or other computers.

99. The computerized system of claim 98 wherein said server computer or computers update said computer implemented model to include said modifications or updated performance predictions.

100. The computerized system of claim 98 further comprising at least one measurement device for measuring performance metrics in said physical environment, said measurement device providing performance measurements or metrics to either or both said at least one portable computer or said server computer or computers.

101. The computerized system of claim 100 wherein either or both said at least one measurement device or said at least one portable computer is operated without human intervention.

102. The computerized system of claim 100 wherein either or both said at least one measurement device or said at least one portable computer is positioned at a fixed location, and wherein either or both said at least one measurement device or said at least one portable computer can be used to passively or autonomously report communication network performance to said server computer or computers, or one or more client computers, or one or more other computers.

103. The computerized system of claim 100 further comprising a display for displaying predicted or simulated data or measurement data.

104. The computerized system of claim 103 wherein said display presents markers or statistics on a building drawing or floor plan which indicate differences between predicted or simulated data and actual measurement data.

105. The computerized system of claim 100 wherein performance measurements are correlated to position information.

106. The computerized system of claim 100 wherein one or more site specific data are communicated between a server computer or computers and said at least one portable computer or another computer, wherein said site specific data includes one or more of network information, measured data, and predicted data, and wherein said site specific data are capable of being processed or analyzed remotely, and of being updated so as to allow new, updated, performance predictions to be communicated between said server computer or computers and said at least one portable computer or another computer.

107. The computerized system of claim 98 further comprising a display for displaying simulated or predicted data as one of a) a grid of data points, b) one or more contours identifying equal performance, and c) one or more points where a simulated user is tracked within a building.

108. A method for designing, deploying, optimizing, modifying or maintaining a communications network, comprising the steps of:
 providing a computer implemented model representing a physical environment in which a communications network is or may be deployed, said computer implemented model providing a representation of locations of one or more components within said physical environment, said computer implemented model can be used for performance prediction of a communications network based on one or more factors selected from the group consisting of choice of components to be used within said physical environment, choice of parameters of said components, choice of locations for said components within said physical environment, and orientation of said components at said locations;
 communicating between a server computer or computers and at least one portable computer, either
 a) performance measurements made in said physical environment with a measurement device that is associated with said at least one portable computer, or
 b) updated performance predictions determined by either said server computer or computers or said at least one portable computer that are based on modifications to said one or more factors;
 updating one or more representations of said computer implemented model to include either said performance measurements or said updated performance predictions; and
 displaying predicted or simulated data or measurement data wherein said displaying step includes the step of presenting markers or statistics on a building drawing or floor plan which indicate differences between predicted or simulated data and actual measurement data.

109. The method of claim 108 wherein either or both a measurement device used for making said performance measurements or said at least one portable computer are operated without human intervention.

110. The method of claim 108 wherein either or both a measurement device used for making said performance measurements or said at least one portable computer are positioned at a fixed location, and further comprising the step of using either or both said measurement device or said at least one portable computer to passively or autonomously report communication network performance to said server computer or computers, or one or more client computers, or one or more other computers.

111. The method of claim 108 further comprising the step of correlating said performance measurements with position information.

112. The method of claim 108 wherein one or more site specific data are communicated between a server computer or computers and said at least one portable computer or another computer, wherein said site specific data includes one or more of network information, measured data, and predicted data, and wherein said site specific data are capable of being processed or analyzed remotely, and of being updated so as to allow new, updated, performance predictions to be communicated between said server computer or computers and said at least one portable computer or another computer.

113. The method of claim 108 further comprising the step of displaying simulated or predicted data as one of a grid of data points, one or more contours identifying equal performance, and one or more points where a simulated user is tracked within a building.

114. The method of claim 108 further comprising the step of position-tracking movements of one or more users within said physical environment, and displaying said movements on a display.

115. A computerized system for designing, deploying, optimizing, modifying or maintaining a communications network, comprising:
- a computer implemented model which provides one or more representations of a physical environment in which a communications network is or may be deployed, said computer implemented model providing a representation representing locations of one or more components within said physical environment, said computer implemented model can be used for performance prediction of a communications network based on one or more factors selected from the group consisting of choice of components to be used within said physical environment, choice of parameters of said components, choice of locations for said components within said physical environment, and orientation of said components at said locations;
- a server computer or computers for running a computer program which uses said computer implemented model;
- at least one portable computer which can download, upload or store one or more representations of said computer implemented model from said server computer or computers, said at least one portable computer can be used to modify, using said one or more representations, one or more factors used in said computer implemented model, and can determine updated performance predictions based on modifications to said one or more factors,
  wherein said at least one portable computer can upload modifications or updated performance predictions to said server computer or computers;
- at least one measurement device for measuring performance metrics in said physical environment, said measurement device providing performance measurements or metrics to either or both said at least one portable computer or said server computer or computers; and
- a display for displaying predicted or simulated data or measurement data, wherein said display presents markers or statistics on a building drawing or floor plan which indicate differences between predicted or simulated data and actual measurement data.

116. The computerized system of claim 115 wherein said server computer or computers update said computer implemented model to include said modifications or updated performance predictions.

117. The computerized system of claim 115 wherein either or both said at least one measurement device or said at least one portable computer is operated without human intervention.

118. The computerized system of claim 115 wherein either or both said at least one measurement device or said at least one portable computer is positioned at a fixed location, and wherein either or both said at least one measurement device or said at least one portable computer can be used to passively or autonomously report communication network performance to said server computer or computers, or one or more client computers, or one or more other computers.

119. The computerized system of claim 115 wherein performance measurements are correlated to position information.

120. The computerized system of claim 115 wherein one or more site specific data are communicated between a server computer or computers and said at least one portable computer or another computer, wherein said site specific data includes one or more of network information, measured data, and predicted data, and wherein said site specific data are capable of being processed or analyzed remotely, and of being updated so as to allow new, updated, performance predictions to be communicated between said server computer or computers and said at least one portable computer or another computer.

121. The computerized system of claim 115 wherein said display displays simulated or predicted data as one of a) a grid of data points, b) one or more contours identifying equal performance, or c) one or more points where a simulated user is tracked within a building.

122. The computerized system of claim 115 further comprising a position-tracking or locationing system, and which displays one or more comparisons of measured position-location with predicted or simulated position-location at either said server computer or computers, or said one or more portable computers, or other computers.

* * * * *

UNITED STATES PATENT AND TRADEMARK OFFICE
CERTIFICATE OF CORRECTION

PATENT NO. : 6,971,063 B1 Page 1 of 1
APPLICATION NO. : 09/628506
DATED : November 29, 2005
INVENTOR(S) : Rappaport et al.

It is certified that error appears in the above-identified patent and that said Letters Patent is hereby corrected as shown below:

Col. 21 line 45 add --or computers-- after "computer"

Col. 22 line 4 add --or computers-- after "said server"

Col. 23 line 5 delete "said"

Col. 23 lines 27-28 delete "of said at least one communication network component"

Col. 23 lines 32-33 delete "of said at least one communication network component"

Col. 23 lines 42-43 delete "of said at least one communication network component"

Col. 29 line 29, change "and" to --or --

Signed and Sealed this

Fifth day of September, 2006

JON W. DUDAS
*Director of the United States Patent and Trademark Office*